(12) United States Patent
Ponce de Leon

(10) Patent No.: US 8,531,459 B1
(45) Date of Patent: *Sep. 10, 2013

(54) GRAPHICAL FORENSIC SCHEDULING SYSTEM

(75) Inventor: Gui Ponce de Leon, Ann Arbor, MI (US)

(73) Assignee: PMA Technologies, LLC, Ann Arbor, MI (US)

( * ) Notice: Subject to any disclaimer, the term of this patent is extended or adjusted under 35 U.S.C. 154(b) by 811 days.

This patent is subject to a terminal disclaimer.

(21) Appl. No.: 12/687,707

(22) Filed: Jan. 14, 2010

(51) Int. Cl.
*G06Q 10/06* (2012.01)

(52) U.S. Cl.
USPC ....... 345/440; 345/440.2; 700/100; 705/7.12; 705/7.21; 705/7.37; 705/7.41

(58) Field of Classification Search
USPC ............. 345/440, 440.2; 700/100; 705/7.12, 705/7.21, 7.37, 7.41
See application file for complete search history.

(56) References Cited

U.S. PATENT DOCUMENTS

| | | | | |
|---|---|---|---|---|
| 4,700,318 | A * | 10/1987 | Ockman | 345/595 |
| 5,016,170 | A * | 5/1991 | Pollalis et al. | 705/7.15 |
| 5,537,524 | A * | 7/1996 | Aprile | 345/440 |
| 8,249,909 | B2 * | 8/2012 | Watanabe et al. | 705/7.23 |
| 2005/0288987 | A1 * | 12/2005 | Sattler et al. | 705/9 |
| 2006/0044307 | A1 * | 3/2006 | Song | 345/419 |
| 2006/0069540 | A1 * | 3/2006 | Krutz | 703/22 |
| 2006/0242419 | A1 * | 10/2006 | Gaffey et al. | 713/176 |
| 2008/0126945 | A1 * | 5/2008 | Munkvold et al. | 715/733 |
| 2008/0195452 | A1 * | 8/2008 | Ponce de Leon | 705/8 |
| 2009/0216602 | A1 * | 8/2009 | Henderson | 705/9 |

OTHER PUBLICATIONS

AACE International Recommended Practice No. 29R-03. Forensic Schedule Analysis. TCM Framework: 6.4—Forensic Performance Assessment. Jun. 25, 2007.

(Continued)

*Primary Examiner* — Xiao M. Wu
*Assistant Examiner* — Todd Buttram
(74) *Attorney, Agent, or Firm* — Carlson, Gaskey & Olds, P.C.

(57) ABSTRACT

A graphical forensic scheduling system is described. The system may receive a data date on a time-scaled project schedule. The system may calculate link gaps based on predecessor and successor relevant dates on either side of the data date. The system may automatically correct logic ties if actual dates for related activities are out-of-sequence. The system may calculate and display forensic floats, forensic drifts, and forensic total floats for actualized activities based on an algorithmic function of all link gaps on either side of the data date, i.e. forensic gap or otherwise. The as-built critical path may be determined based on the forensic total floats. The system may continuously and automatically refresh in real-time, forensic float, forensic drift and forensic total float any time a gap on either side of the data date takes on a revised value due to activities being repositioned on the timescale. The system, by supporting GPM rules, may automatically heal corrupted logic right of the data date and automatically and continuously refresh forensic float, forensic drift and forensic total float on either side of the data date. The system may optimize the schedule by sliding and/or shortening or lengthening activities, and maintain forensic float, forensic drift and forensic total float current with respect to such optimization schemes taking place right of the data date. The system may support gestural recognition, surface computing and voice recognition, and provide users with visual feedback on the impact to a schedule, both prior to and subsequent the data date, immediately upon gestural or surface input.

23 Claims, 15 Drawing Sheets

(56) References Cited

OTHER PUBLICATIONS

AACE International Recommended Practice No. 29R-03. Forensic Schedule Analysis. TCM Framework: 6.4—Forensic Performance Assessment. Jun. 23, 2009.

AACE International Recommended Practice No. 29R-03. Forensic Schedule Analysis. TCM Framework: 6.4—Forensic Performance Assessment. Apr. 25, 2011.

* cited by examiner

FIG. 4

| Selected Activities (logic chains are color coded) | GPM Solution | | | Equivalent CPM Solution | | |
|---|---|---|---|---|---|---|
| | Drift | Float | Total Float | Drift | Float | Total Float |
| Steel Shops | 0 | 5 | 5 | 0 | 5 | 5 |
| First Steel Delivery | 0 | 5 | 5 | 0 | 5 | 5 |
| Masonry | 7 | 28 | 35 | 0 | 35 | 35 |
| Interior Walls | 7 | 28 | 35 | 0 | 35 | 35 |
| Finish MEP | 20 | 11 | 31 | 0 | 31 | 31 |
| FF&E Bid and Award | 7 | 14 | 21 | 0 | 21 | 21 |
| FF&E Installs | 7 | 14 | 21 | 0 | 21 | 21 |

| Primary Method | Data Date (DD) | CPM Calcs Available |
|---|---|---|
| Impacted As-Planned | Project Start Event | Yes, Right of DD (IAP is Prospective) |
| Modeled Updates | For Each Window | Yes, Both Left and Right of DD |
| TIA, Contemporaneous | Day Before Delay Occurs | Yes, Both Left and Right of DD |
| TIA, Retrospective | DD for Each Window | Yes, Both Left and Right of DD |
| Collapsed As Built | Project Completion Event | Yes, Left of DD (CAB is Retrospective) |
| Observational Updates | DD for Each Update | Yes, Both Left and Right of DD |

1500b

| Primary Method | Data Date (DD) | CPM Calcs Available |
|---|---|---|
| Impacted As-Planned | Project Start Event | Yes, IAP is fully prospective |
| TIA, Contemporaneous | Day Before Delay Occurs | No, Left of DD; Yes, Right of DD |
| TIA, Retrospective | DD for Each Window | No, Left of DD; Yes, Right of DD |
| Collapsed As Built | Project Completion Event | Not at All, CAB is Fully Retrospective |
| Observational Updates | DD for Each Update | No, Left of DD |

GRAPHICAL FORENSIC SCHEDULING SYSTEM

COPYRIGHT NOTICE

A portion of the disclosure of this patent document contains material which is subject to copyright protection. The copyright owner has no objection to the facsimile reproduction by anyone of the patent document of the patent disclosure, as it appears in the Patent and Trademark Office patent file or records, but otherwise reserves all copyright rights whatsoever.

BACKGROUND

Once a project is underway, analyzing the project schedule at a point in time, the data date, to verify that completion is on track, and to possibly revise the plan and schedule going forward is a common process. Starting with the established plan and schedule (schedule model), schedule analysis, as of the data date, includes investigating the impact of delay events that have occurred and those that are anticipated to occur. Schedule analysis performed contemporaneously with or before the delay event is prospective. Retrospective analysis performed within the context of a legal proceeding, after the delay event has occurred and impacts are knowable, is forensic schedule analysis.

The Critical Path Method ("CPM") has been the dominant scheduling paradigm in project management for over fifty years. CPM is based on complex mathematical algorithms. CPM receives as inputs a list of activities required to complete a project, the duration of each activity and a dependency relationship between the activities. CPM stores the information in databases and utilizes inline scheduling engines to carry out schedule calculations in a succession of batch modes.

In the 1960s, CPM began gaining acceptance as a tool to evaluate schedule delay. Unlike Gantt charts, CPM was rule-based and considered the relationships between activities. Analysis of delayed performance could be approached by inserting delay activities in the schedule, and calculating the impact on activity dates, logic sequences, activity total floats, the critical path and the completion of the project. Analysts also realized that possible causes of delay could be inferred by comparing two schedules, or a particular logic chain in two schedules, and studying changes in activity durations, dates and total floats. Such comparisons were useful, even if they did not provide the detail necessary to allocate activity-level variances to specific delay causal events or calculate the effect of activity-level variances on parallel logic chains.

Several methods of forensic schedule analysis exist using CPM. Modeled methods begin either by inserting in the schedule, or extracting from the schedule, activities portraying the impact of unplanned events. The schedule is then recalculated and compared to the before state. Observational methods examine a schedule in comparison with another, with the analyst not changing the schedule or applying the CPM algorithms to calculate an impact scenario. Modeled methods rely on the as-planned schedule, a baseline statused before a specific delay or the as-built schedule. Exemplary modeled methods include Impacted As-Planned ("IAP"), Time Impact Analysis ("TIA") and Collapsed As-Build ("CAB"). Observational methods infer causes from activity-level variances by comparing the as-planned v. as-built, the as-planned v. an update or two updates. A brief explanation and critique of these schedule analysis methods follows.

First, IAP analysis inserts activities for excusable or compensable delay in the as-planned schedule, and compares the recalculated results (i.e. as-planned plus impacts) to the as-planned, before the insertion(s). The as-planned schedule is the only schedule model necessary to undertake an IAP analysis. Accordingly, IAP requires an as-planned schedule that is validated as reasonable for use as a baseline. If the contractor's original (i.e. source) schedule was unbiased by status or time impacts, was accurate, reflected the contractor's original intent and conformed to the contract, then it could serve as a reasonable baseline. In practice, however, it is rare for a source schedule to be valid for IAP analysis without adjustment or alteration. Complications arise when the analyst is faced with contending, conflicting source summary and detailed schedules, when the source contains thousands of activities, and when the source is available in hard copy only, without disclosing all relationships and total floats. These complications are not unique to IAP as they afflict time impact analysis as well, discussed below. In addition, IAP is disfavored (even with a reasonable as-planned schedule) particularly for compensable delays. Inserting compensable delays and allocating responsibility to the owner for the resulting extension, without considering contractor delay are weak hypotheticals. It ignores what actually happens on the project by failing to consider actual performance by all parties, e.g. the contractor.

Second, TIA analysis is prospective and based on the analysis of delays in real time, before they occur. The all-important predicate for any TIA analysis is for the schedule model to be current with activity actual dates and remaining durations and the plan going forward. Three steps are involved. First, the as-planned schedule is statused through a closing date immediately before occurrence of a delay. Next, the prospective portion of the schedule model is revised to reflect the plan going forward. In the final step, the delay is inserted in the prospective portion of the schedule and the resulting critical path and completion date are compared to those from the second step.

The prospective application of TIA is conditioned upon four predicates. Early submittal and prompt acceptance of a suitable baseline schedule are pivotal. Once formed, the baseline schedule must be regularly statused to a data date and kept current to the right of the data date. Last, but not least, if slippage has occurred by the data date, the causing delays must be modeled so that any dependencies between delays past and to the future of the data date are properly considered. These hurdles are not insignificant, particularly when the baseline is pursued at a Level 3 degree of detail.

When TIA is applied retrospectively, TIA proceeds in windows rather than when delay events occur. For each window, the schedule model is made current, or statused, within the window by using actual activity durations and actualized logic, but not actual dates; and beyond the window, by revising activities and logic to reflect contemporaneous intentions for the plan going forward. Next, time impacts that actually occurred during the window are inserted in the logical sequence and timeframes in which they occurred, and the schedule model is recalculated with the prior window closing date. This ensures that when the next window is evaluated, time impacts that have occurred in the prior windows are modeled and can be considered for serial effect. Lastly, the window is fully statused by introducing actual dates for the activities and actualized logic, at which point the window closing date becomes the data date for the schedule going forward.

When TIA is applied retrospectively, bias can be introduced simply by the choice of the event determining the closing date for a window. Widely-divergent windows compromise the method's ability to properly pinpoint shifts in the critical path(s). Retrospective TIA applications permit concealing an actual critical path shift by cherry-picking windows or choosing longer windows. The choice of windows can affect the outcome of the analysis. However, these flaws in the retrospective application of TIA may be solved with windows at regular intervals rather than immediately before delay events.

Third, CAB analysis is retrospective, based on activity actual dates, durations and logic sequences, including delays. The theoretical application of CAB extracts from as-built activity durations excusable or compensable delays. Next, extracted delays are removed and the collapsed as-built is recalculated. In the final step, the collapsed results are compared to the as-build, before collapsing. The downside is that CAB requires a contemporaneous as-built schedule or one built by the analyst. Contemporaneous as-build schedules may be reliable sources of actual dates and activity date variances, but they seldom provide reliable as-built data as to activity intermittent works, actual logic ties, critical path shits or time impacts, which means that they are rarely usable as is. Adjusting or building a reasonable as-built schedule after the fact is resource intense, and is best approached with due care to avoid shortcomings possibly afflicting the method, such as vulnerability to inadequate or manipulated analysis.

Fourth, observational methods rely on comparisons and serve as methods unto themselves or as a preliminary step to more detailed modeled analyses. In the method of as-planned versus as-built, the as-planned schedule is compared to the as-built schedule to identify differences between the planned and actual progression of the activities, allow the Criticisms to observational methods run the gamut from lacking scientific precision, to "smoke and mirrors" and questionability as to whether such methods should survive a Daubert review. There seems to be agreement that simply comparing two schedules without CPM calculating impact on the critical path falls short of an analysis.

The foregoing schedule analysis methods suffer due to the shortcomings and limitations of CPM. CPM was developed in the late 1950s as a prospective method for planning and scheduling an entire project, before work was started. CPM did not initially consider updating and making the network schedule current with progress once the project started. In the early 1960s, schedule analysis was introduced using CPM. However, schedule analysis methods then, as now, applied CPM calculations only to the portion of the network right of the data date.

Once actual dates are introduced in the scheduling process, the CPM algorithms cease to function for the portion of the network left of the data date. The CPM calculations go inactive to the past of the data date for two reasons. First, total floats can no longer be calculated using the CPM equation of late finish date (or actual finish) less early finish date (also actual finish). Second, even if total float, in the conventional CPM sense, could be inferred by observation, corrections would have to be made because, for any completed activity, actual dates may not have occurred on the earliest possible actual dates, a necessary condition for CPM to correctly calculate activity as-built total floats.

CPM's inability to calculate total floats in the past (left of the data date) hinders retrospective schedule analysis as the critical path cannot be CPM-calculated for the as-built portion of a schedule (or the as-built schedule for that matter). This retrospective void in CPM, in addition to the shortcomings and limitations discussed supra, is recognized in forensic applications.

DEFINITIONS

Activity-on-link ("AOL")—Network diagramming notation in which lines (with or without arrowheads) symbolize activities, and relationships are expressed through activity nodes.

Activity-on-node ("AON")—Network diagramming notation in which nodes (circles or boxes) symbolize activities and connecting lines convey relationships. When first introduced it was known as the circle-and-line diagram.

Actualized activity—Activity statused with actual start date, actual finish date and actual duration.

Actualized logic ties (or links)—Logic tie or link connecting two statused activities or objects.

Additive modeling—Scheduling analysis modeling techniques that insert in a schedule model, to the future of the (hard) data date, activities or a fragnet for an unplanned event and, by applying either the CPM or GPM algorithms, recalculate the effect on planned activity dates, durations, logic sequence, the project completion date and the critical path.

Arrow Diagramming Method ("ADM")—AOL network diagramming notation introduced with CPM. In ADM notation, activities are conveyed by lines with arrowheads and start nodes and finish nodes and logic ties are conveyed by connecting activities through common nodes or using dummy (zero duration) activities. Each logic tie connects the finish node of the particular activity to the start node of a successor activity, which means that only finish-to-start ("FS") relationships can be modeled. This is also referred to as the FS logic rule.

As-built critical path—Continuous path from project start event to project completion event, for which if any activity on the path would have been delayed by one day, completion of the project would have been equally delayed.

As-built schedule—Fully-statused schedule recording actual dates for the activities and actualizing logic, and representing a reasonable network schedule to model the effect of time impacts. To qualify an as-built schedule, the cause of time impacts may not be shown as long as the effect is shown (i.e. activity-level variances); nor is all detail necessary, provided a reasonable summary is prepared properly including the critical path and near critical paths.

As-planned schedule—Unprogressed, unimpacted network and schedule (Level 2 and/or 3) validated by the analyst as portraying a realistic and achievable summary plan conforming to the contract, and representing a reasonable network schedule to model the effect of time impacts. To qualify as a forensic as-planned schedule, not all detail is necessary, provided a reasonable summary is prepared properly including the critical path and near critical paths.

Baseline schedule—Unprogressed, unimpacted initial Rev. 0 Schedule disclosing the contractor's approach to the work in sufficient detail (Level 3 network) that was reviewed by the owner for conformance to the contract and returned as resubmittal not required, with or without objections, and used in the schedule statusing process.

Benchmark—A GPM object for an event (instant point in time) designating a hard deadline or used to "cut" floats (drifts), if floats (drifts) are to be allocated to the phase defined by the benchmark versus accumulating from schedule completion (to project start). A benchmark is fixed and cannot shift from its stipulated date, thus having zero total float.

Buffer—GPM counterpart to CPM free float, except that is not necessarily measured from early dates. Buffer equals the minimum of all link gaps to the activity's successors.

But-for as-built—Modeled as-built schedule, after time impacts have been removed, determining when the project would have been completed, but-for the time impacts removed.

But-for modeled update—Statused window, after time impacts have been removed, determining when the project would have been completed, but-for the time impacts removed.

Collapse—Technique that removes a delay from a schedule model by zeroing out the delay or, if schedule compression algorithms are used, by crashing the delay, to determine when the project would have been completed and the associated critical path, but-for the delay.

Collapsed as-built—Single-base, subtractive method that starts with the modeled as-built schedule, extracts activities modeling time impacts in proper sequence, and recalculates activity dates, the critical path and the project completion date, but-for the extracted delays.

Collapsible as-built—Technique required to prepare a modeled as-built schedule for but-for simulations using CPM, which removes actual dates and calculates simulated early dates based on the actual durations and actualized logic. Not required for but-for simulations using GPM because the GPM algorithms remain active to the left of the data date.

Concurrent Delay—Within one window, two delays occurring at the same time or different times independently of one another, both delaying completion, are concurrent (functional window concurrency school), with the extent of concurrency depending on their relative total floats. A delay is concurrent if unavoidable, as opposed to pacing, which is avoidable.

Construction Specifications Institute—Organization in the United States that produces the MasterFormat system of specifications for organizing construction project manuals into Groups, Subgroups, numbered Divisions and numbered Specifications.

Contract float—Total float to a contract completion date measuring days between required and projected completion available to offset critical path delay pursuant to applicable contract provisions or, if not provided in the contract, as reasonably inferable from the schedule.

Corrected logic—Logic tie left of the data date that has been modified to correct for out-of-sequence actual dates (breaching the tenets of the logic tie) and eliminate negative forensic gaps, thereby providing coherent forensic drifts, forensic floats and forensic total floats.

Corrected logic rule—GPM-recommended rules to transform out-of-sequence progress (i.e. actualized logic ties with negative forensic gaps) into equivalent driving, zero-gap logic ties, or finish-to-start logic ties by subdividing the predecessor and/or successor activities.

Critical path—Any logically—connected, continuous sequence of Level 2, or equivalent Level 3 activities, controlling completion of the project, or designated portion. If any such activity in the sequence is delayed, completion is equally delayed or, if contract float exists, contract float is equally reduced by the delay. Within one window, any chain carrying negative total floats is critical (window zero total-float school).

Critical path method—Networking method introduced in the 1950s as a prospective tool for planning and scheduling an entire project. Extended in the 1960s for scheduling the balance of a partly completed project, and for retrospectively evaluating schedule performance.

Data date—Update or window closing date, considered a soft data date while the window is statused but before actual dates are introduced. It becomes a hard data date when actual dates are introduced, dividing the schedule model into a retrospective portion (left of the data date) and prospective portion (right of the data date). The conventional interpretation of the data date is as a hard data date, unless otherwise specifically referred to as a soft data date.

De-impacting—But-for technique that removes time impacts from the as-built schedule or an as-built window, by crashing delays and stretching gains, and recalculates the schedule model. A term more encompassing than "collapsing."

Disruption—Interference, interruption, re-sequencing, re-assignment or other like event imposed on planned sequences, resulting in loss of production and lost productivity, and which, if not recovered, materializes as embedded delay within the disrupted activity.

Division—The fifty numbered Divisions in the MasterFormat, arranged by Subgroups.

Drift—GPM-calculated activity attribute measuring days an activity may backslide and/or extend to an earlier position without necessarily forcing an earlier project start or interim release date. Drift plus float is a constant, which equals conventional CPM total float.

Driving link—A zero-gap logic tie. Conversely, a positive-gap logic tie is a non-driving link.

Embedded Node—Event intermediate of, or right on the start or finish node of an activity, through which the activity is connected to a successor start node, from a predecessor finish node, to/from an embed of another activity or to/from a milestone or benchmark.

Float—GPM-calculated activity attribute measuring days an activity may slip from and/or extend beyond planned dates without necessarily causing and overrun of a pertinent contract time. Float is analogous to total float, except it is measured from planned dates rather than CPM early dates, and when combined with drift, quantifies total float.

Float map—Table listing selected activities from the baseline and selected updates along with their respective total float values, from update to update.

Forensic drift—GPM-calculated attribute for a completed activity measuring days the activity could have drifted to earlier actual dates without forcing an earlier project start (or earlier interim release date).

Forensic float—GPM-calculated attribute for a completed activity measuring days the activity could have floated beyond its actual dates without delaying the project (or an interim completion date).

Forensic gap—GPM-calculated attribute measuring for two related, actualized activities days the predecessor could have slipped and/or extended without delaying the successor.

Forensic total float—GPM-calculated attribute equal to forensic float plus forensic drift, which continuously refreshes until the data date is on the project completion date.

Fragnet—Common term for a sub-network that breaks down the duration of one or more activities into logically interconnected sub-activities. If a fragnet includes time impacts, it is referred to as a time-impacted fragnet.

Gain (schedule gain)—Opposite of delay caused by and resulting from an event that improves the rate of progress and causes earlier activity dates, shorter durations and/or earlier completion. Gain may stem from use of overtime, more efficient means and methods, increased crew size, earlier deliveries, productivity improvements, less adverse weather than the norm, increased activity overlap, pessimistic (originally overstated) activity durations, predecessors' gain or any other factor increasing production.

Gantt chart—A time-scaled chart of activities and their respective durations and start and finish dates, but without logic ties or any calculated float values the activities, developed by Henry L. Gantt and Fredrick W. Taylor in the early 1900s.

Gap (link gap)—GPM-calculated attribute measuring for two related activities days the predecessor may slip and/or extend without delaying the successor. Drift-gap measures days the successor may gain and/or extend to earlier dates without forcing the predecessor back.

Gestural—Term denoting an external event, consisting of touch or hand-directed stylus, that drives a computer graphics application in place of, or in addition to a mouse and keyboard.

GPM® (Graphical Path (or Planning) Method)—Network-based planning/scheduling method anchored on object-based principles, and rooted in network graph algorithms active on either side of the data date line, thereby facilitating real-time analysis, when planning the schedule, when statusing the schedule, and when performing schedule analysis.

Hammock—Feature that aggregates all the activities, activity dates and interconnecting logic ties within a fragnet into one continuous summary activity spanning from the earliest start date of the fragnet to the latest early finish of the fragnet. When diagramed, it appears as though the fragnet hangs from the hammock.

Hard logic—Network logic ties (modeling activity relationships) that are predicated solely on natural sequences applying to the work being scheduled, without considering resource constraints stemming from headcount limits or a shared-resource. Hard logic was originally referred to by the CPM developers as technological dependencies.

Impacted As-Planned ("TAP")—Single-base, additive method that starts with the validated (reasonable) as-planned schedule, inserts activities modeling excusable or compensable delays, and recalculates activity dates, floats, the critical path and the project completion date. When conventionally applied, it does not by itself resolve delay concurrency.

Lag—PDM network element denoting, for two related activities, the minimum waiting time between the start or finish of the predecessor and the start or finish of the successor.

Level 2 detail—Project management-level schedule portraying, for each building, structure or facilities, major activity-logic sequences for controlling Divisions within Subgroups.

Level 3 detail—Project controls-level schedule subdividing major controlling activity-logic sequences into fragnets as appropriate for design-construction interface, vendor submittals, deliveries, subcontractor and trade coordination, commissioning and project controls.

Level 3 fragnet—Activity and logic ties at a Level 3 (project controls) detail subdividing the corresponding Level 2 hammock activity(ies).

Logic Diagramming Method ("LDM")—AOL network diagramming method introduced with GPM that blends a unique time-scaled version of ADM notation with PDM logic.

Logic sequence—Order in which two related activities are to be performed (same as logic).

Milestone—Key transition, dated event (zero duration) in the progress of the work setting forth a deadline for, or distributing the overall duration of the project to, several important stages. If logically tied to an activity, and depending on the relationship type, a milestone date may be controlled, if unrestrained, by the related activity.

Modeled Updated ("MU")—Method that, when applied retrospectively, starts with the as-planned schedule and as-built records, and relies on multiple updates to model time impacts and locate critical path shifts, each update (window) coinciding with a pertinent contemporaneous update. When applied prospectively, the method essentially becomes an enhanced TIA at fixed intervals as it extracts time impacts, calculates forensic total float and locates the critical path left of the data date. MU is the suggested preferred method for determining serial effect stemming from delays occurring left of the data date.

Normal weather—If not stipulated in the specifications, reasonable anticipated weather conditions at the site derived from an analysis of the prior 10-year weather record.

Object—A rule-encapsulating GPM schedule element symbolizing an activity, embedded node, benchmark, milestone or link, which is positioned on the time-scaled display and possesses attributes.

Objectbase—Characterized by a collection of rule-encapsulating computer objects that, in response to external events, inherently interact via message passing to drive a visual model.

Offset—Denotes the minimum interval between the connected dates of two related activities (e.g. an FS offset denotes the minimum interval between the finish of the predecessor and start of the successor; an SS offset denotes the minimum interval between the start of the predecessor and start of the successor; and so forth). GPM offset is equivalent to PDM lag.

Orphaned (open) node—Start node of an activity is unrestrained because the activity has neither a finish-to-start nor a start-to-start predecessor. Also, the finish node of an activity is unrestrained because the activity has neither a finish-to-start nor finish-to-finish successor.

Out-of-sequence progress—Actual dates for two related activities breach the tenets of the relationship type, causing negative forensic gap and compromising forensic total float values.

Pacing delay—Avoidable delay that, even though not caused by a concurrent controlling delay, results from a conscious and contemporaneous decision to pace progress on the paced activity against the controlling delay. Pacing delays consume CPM total float (float, if the GPM algorithms are being used), whether pre-existing or created by the controlling delay.

Precedence Diagramming Method ("PDM")—AON network diagramming method that extends the original activity-on-node model to allow four types of relationships. In PDM, an activity may start or finish sometime after a predecessor has started or finished.

Preferential or soft logic—Planner-devised logic tie sequencing activities sharing a resource or enforcing preferred means and methods, which, as a matter of practice, allocates total float to the contractor away from the project. If not negated by float sharing provisions, may not be subject to removal to offset owner delay without attendant compensation.

Reference updates—Contemporaneous updates prepared and submitted by the contractor under the requirements of the contract and progress schedule specifications.

Relationship—Network element denoting the logic dependency between two directly-connected activities. In GPM, relationships are stated as between two directly-connected objects, e.g., an activity precedes a milestone, a milestone precedes a benchmark, etc.

Retrospective time impact analysis—Multiple base, additive and subtractive method, each baseline consisting of a window (recreated update) of the as-planned schedule, statused (actualized) through the window closing date, and at the same time, brought up-to-date with the contemporaneous intentions for remaining work, as to the window closing date.

Source schedule—Schedule included with the contract and/or submitted by the contractor at the onset of the contract, providing a suitable basis for the As-Planned Schedule.

Statused activity—In-progress activity with an actual start date and remaining duration or completed activity with an actual start date and actual finish date.

Subgroup—One of five in the MasterFormat Specifications Group, each divided into numbered Divisions. The five Subgroups are: General Requirements (Division 01); Facility Construction (Division 02-14); Facility Services (Division 21-28); Site and Infrastructure (Division 31-35); and Process Equipment (Division 41-48).

Subtractive modeling—Retrospective scheduling analysis modeling techniques that remove activities or a fragnet for an unplanned event, and recalculate the effect on the project completion and critical path, directly on the as-built schedule with GPM, or on a prospective simulation of the as-built with CPM. It may also apply to a window of the as-built model.

Time impact—Activities resulting from an unplanned event and their combined effect on activity durations, dates, logic sequences, the critical path and project completion. Time impacts quantify delay or gain. A gain may be referred to as a negative delay.

Time Impact Analysis ("TIA")—Multiple base, additive method, each baseline consisting of the as-planned schedule statused to a data date immediately before occurrence of a delay, and made current with contemporaneous intentions for the plan going forward.

Total float—Attribute calculated by both CPM and GPM, measuring days an activity may slip from and/or extend beyond its early dates without necessarily causing an overrun of a pertinent contract time. Total float may include contract float, unless otherwise specified.

Weather Calendar—CPM or GPM scheduling software feature that deducts normal weather days from the normal working schedule.

Windows—Property of methods that analyze a schedule in segments, each segment coinciding with a contemporaneous update, for the purpose of identifying shifts in critical paths and confining quantification of prolongation to critical delays, one window at a time.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 4 is a table contrasting GPM and CPM solutions with respect to drifts and floats based on the exemplary project schedules shown in FIGS. 2 and 3.

FIG. 15 is two tables summarizing the primary methods of schedule analysis and the calculations available using GPM and CPM.

DETAILED DESCRIPTION

The present invention is based on the discovery of the Graphical Path Method ("GPM"). Like CPM, GPM is a rule-based planning and scheduling method that uses a network of activities in logical sequence to calculate project completion, total floats and the critical path. However, there are major differences and enhancements that underscore how GPM retools schedule analysis, as a result of the use of different scheduling principles, alternate network graph algorithms, and modern computer graphics relying on objectbase principles and using gestural technology.

Unlike CPM, GPM is an interactive process that enables real-time analysis when planning and updating the schedule, and when performing modeled forensic schedule analysis involving the as-built or a schedule window. GPM is rooted in algorithms active on either side of the data date line. With GPM being data date neutral, retrospective schedule analysis is not stymied by the CPM forensic void. GPM brings time-scaled networks to the forefront as a working platform, and not just as after-the-fact, batched printouts. GPM networks readily double as schedule models and rule-based forensic demonstratives that are intuitively understood by non-schedulers.

GPM relies on the Logic Diagramming Method ("LDM") a network notation resembling a time-scaled Arrow Diagramming Method ("ADM") that combines ADM with Precedence Diagramming Method ("PDM") logic. Start-to-start ("SS"), finish-to-finish ("FF") and start-to-finish ("SF") logic is accepted through embedded nodes, placed between or directly on an activity's start or finish node. Driving relationships graph as a common node or vertical link. Non-driving links include a horizontal leg.

Figure 1:
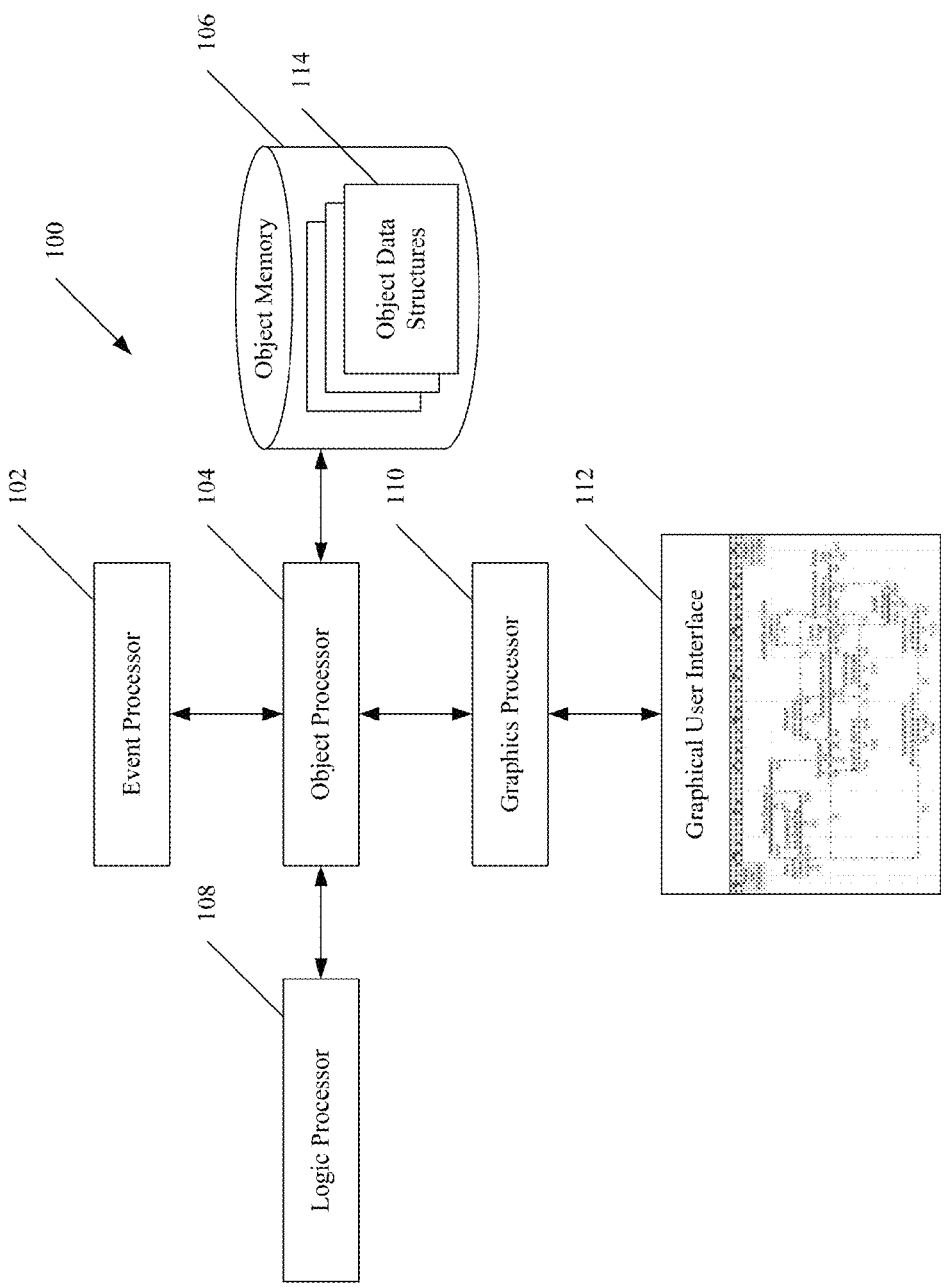
FIG. 1 is a block diagram of an exemplary graphical forensic scheduling system.

An example of a graphical forensic scheduling system 100 is shown in FIG. 1. The system 100 is based in objectbase principles, where the objects contain embedded rules and computational algorithms that interact with one another through message passing in order to perform planning and scheduling functions in real time. As shown, the system 100 includes an event processor 102, an object processor 104 coupled with the event processor 102, an object memory 106 coupled with the object processor 104, a logic processor 108 coupled with the object processor, a graphics processor 110 coupled with the object processor 104, and a graphical user interface ("GUI") 112 coupled with the graphics processor 110. Herein, the phrase "coupled with" is defined to mean directly connected to or indirectly connected through one or more intermediate components. Such intermediate components may include both hardware and software based components.

Each of the processors may be implemented in software, hardware or a combination thereof and one or more of the processors may be integrated together or further subdivided into additional discrete components. The system 100 may be implemented in one or more computer programs executing on one or more programmable systems comprising at least one processor and at least one data storage system. Each such program may be implemented in any desired computer language to communicate with a computer system.

The system 100 may also include a network that enables the processors and/or other computing devices to communicate and pass data to and from one another. The network may include any communication method by which information may travel between computing devices. The network may include one or more of a wireless network, a wired network, a local area network ("LAN"), a wide area network ("WAN"), a direct connection such as through a Universal Serial Bus ("USB") port, and may include the set of interconnected networks that make up the Internet, an intranet, or other communication network.

The event processor 102 monitors and detects events that occur on the system 100, e.g. user interactions with the system 100. An event may include a computer mouse click or movement, keyboard press, gestural and/or surface input. The event processor 102 may detect an event and process the event. The event processor 102 may create data packets that may be representative of the event. The data packets may be utilized and/or processed by other components of the system 100, discussed below. The data packets may be passed to other components of the system 100 through message passing. In one example, the event processor detects a data date or other input that represents a particular point in time, e.g. day to where a project has progressed.

The object processor 104 is coupled with the event processor 102 and may create, maintain and/or update objects utilized by system 100. For example, the object processor 104 may create objects representative of activities, milestones, benchmarks, embedded nodes, logic relationships, data dates, and project start and end dates. The objects may be represented as data structures 114. The object processor 104 may create or modify data structures 114 based on instructions it receives from the event processor 102 relating to one or more events, or as described below, based on information it receives from the logic processor 108. For example, the object processor 104 may create and/or update a data structure representative of a data date input by a user.

The data structures 114 contain data representative of the objects and rules that define the behavior of the objects at any given time. The object processor 104 may maintain the state, rules and data of each of the data structures 114. The data structures 114 may be stored in object memory 106, which may include high-speed random access memory and/or non-volatile memory, such as one or more magnetic disk storage devices, one or more optical storage devices, and/or flash memory. The data structures 114 may be stored as dynamic files for describing and transferring data, such as an extensible markup language ("XML"), or other formats, such as standard generalized markup language ("SGML").

The data structures 114 may include attributes related to the object, such as the start date, end date, duration, object description, object type, object category, color, and any other data related to the object. The object processor 104 may automatically calculate object attributes based on instructions it receives from the event processor 102, e.g. start date, end date and duration. A user may also manually enter object attributes that the object processor 104 implements into the data structures, e.g. object description, color, and resources and costs. The data structures 114 may also store logic rules that may be based on GPM and that define how objects may behave in the system at any given time. For example, the logic rules may govern how the objects may be shifted, crashed or extended on the time-scaled display. The logic rules may be specific to a particular object, specific to a particular type of object or applicable to all objects creatable by the system 100.

The logic processor 108 is coupled with the object processor 104 and may perform calculations on objects. The logic processor 108 may perform calculations on objects based on GPM principles. GPM is described in commonly owned U.S. Publication No. 2008/0195452, entitled "Interactive Graphics-Based Planning Systems," filed on Feb. 11, 2008. For example, the logic processor 108 may calculate gap, float, drift, total float, buffer, and perform forensic analysis, described below. The logic processor 108 may create a log of calculations applied to objects and pass the log to the object processor 104, which may update the data structures 114 accordingly and store the updated data structures in object memory 106.

The graphics processor 110 is coupled with the object processor 104 and may formulate and display images on the GUI 112, described below. The graphics processor 110 may receive instructions from the object processor 104, which may contain data structures 114 that may be displayed on the GUI 112. The graphics processor 110 processes the data structures 114 and creates an image in memory containing representations of all data structures 114 passed by the object processor 104. The image in memory may be used to format each pixel on the GUI 112 so that each object, represented by the data structures 114, is rendered on the GUI 112. The graphics processor 110 may display the image on the GUI, or other graphical device, to be displayed to a user.

The GUI 112 is coupled with the graphics processor 110 and may include one or more time-scaled displays, where users may interactively plan and schedule a project. The time-scaled display may be customized to mimic real-world characteristics of a project. For example, a user may customize the time-scaled display to include a project start date and completion date and project calendar settings, e.g. work week length, work day length, holiday schedule, etc. The GUI 112 may also contain one or more interface tools, including menus, dialog boxes, toolbars, etc. The GUI 112 may display other graphical and/or textual information representing aspects of the project and/or schedule. The GUI 112 may utilize colors, color shades and/or hatching patterns to distinguish different aspects of the project and/or schedule.

The system 100 may be utilized in connection with and/or support gestural recognition, surface computing and voice recognition. For example, the system 100 may incorporate a PANELWORX™ touch screen with DRAGON NATURALLY SPEAKING™ voice recognition software. The system 100 may interpret human gestures and motions, including hand motions, arm movements, etc. The system 100 may also support surface computing where a user may interact directly with a touch-sensitive screen via hand, finger, or surface interactions with an electronic device, such as a stylus. For example, the user may manipulate objects on GUI 112 by touch. The system 100 gives users the ability to witness and receive visual feedback on the impact to a schedule immediately upon gestural or surface input.

Figure 2:
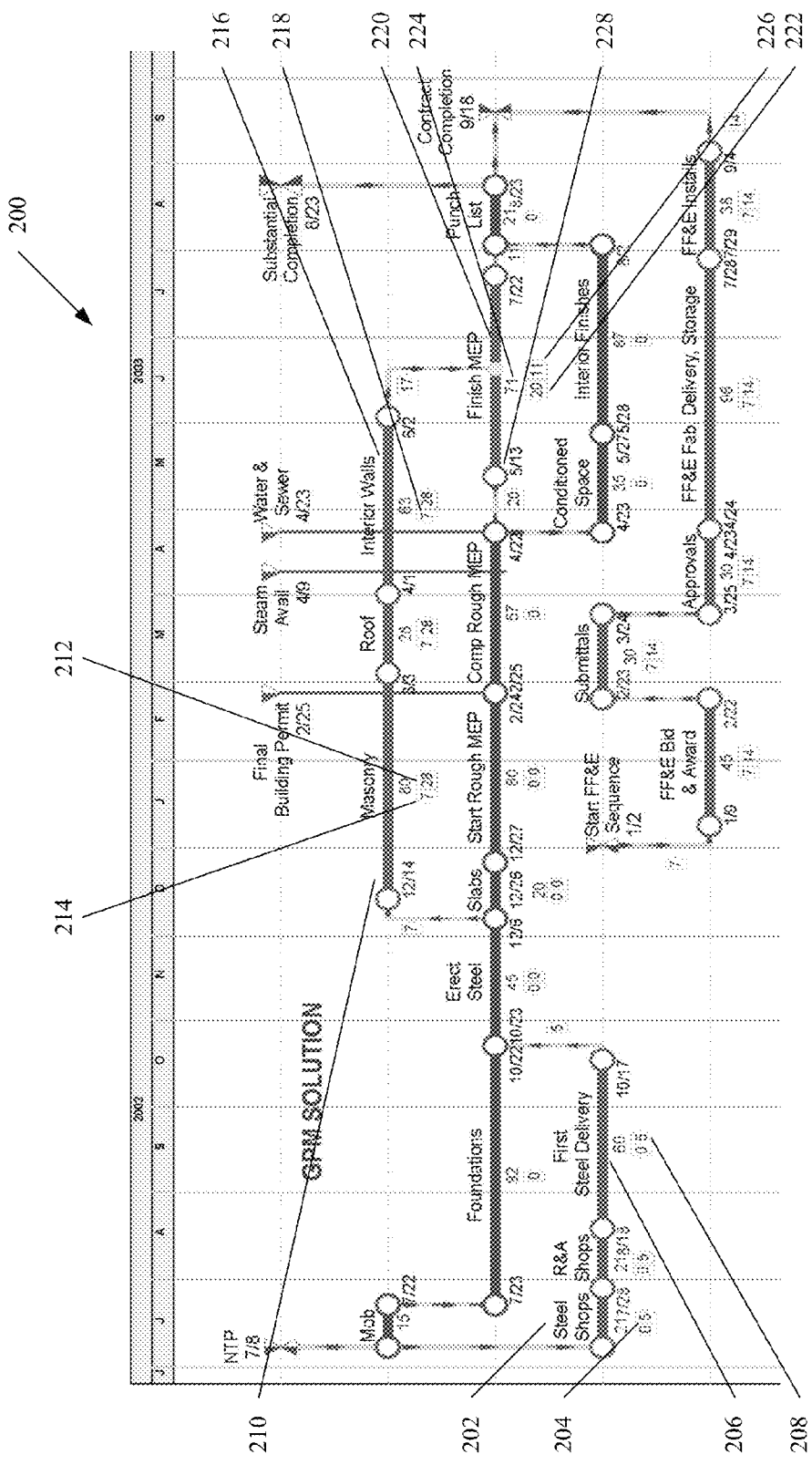
FIG. 2 is an exemplary project schedule.

When planning and forecasting (i.e. working right of the data date) in the system 100, activities are scheduled in planned dates, not necessarily in conventional CPM early dates. With activities scheduled on other than their early dates, they may float in either direction. For example, FIG. 2 shows an exemplary GPM schedule 200 displaying drift and float in LDM notation that may be created by the system 100. An activity that may be delayed and not delay the project has available float and may be referred to as a floater. In the example of FIG. 2, the following selected activities, among others, are floaters: "Steel Shops" 202 (float is 5 days 204), "First Steel Delivery" 206 (float is 5 days 208), and "Masonry" 210 (float is 28 days 212). An activity that may gain schedule and not force an earlier project start has available drift, and may be referred to as a drifter. In the example of FIG. 2, the following selected activities, among others, are drifters: "Masonry" 210 (drift is 7 days 214), "Interior Walls" 216 (drift is 7 days 218), and "Finish MEP" 220 (drift is 20 days 222).

Figure 3:
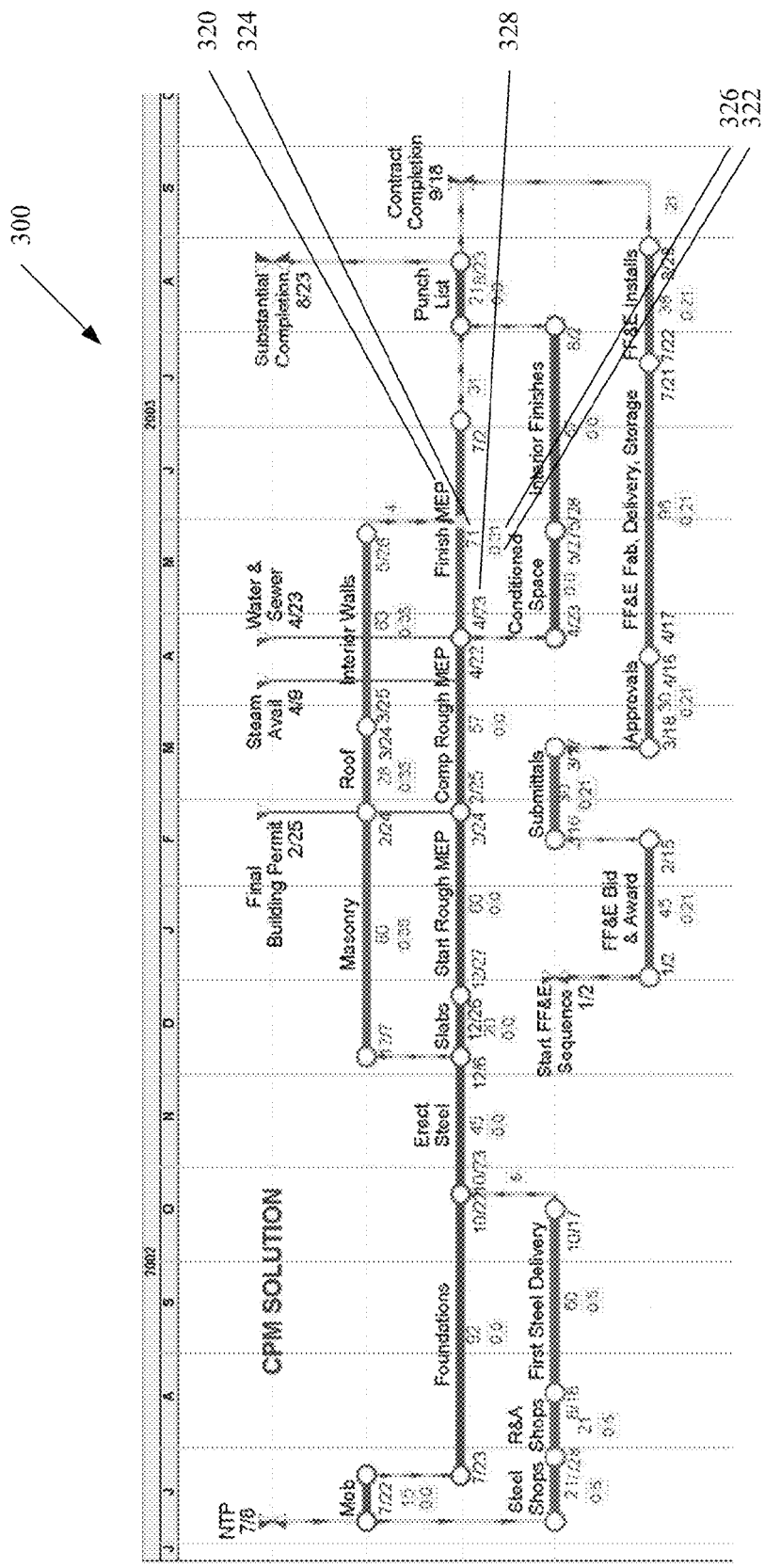
FIG. 3 is an exemplary project schedule.

For every activity, float plus drift equals CPM total float. In CPM, total float of an activity is determined by the difference between the late finish dates and early finish dates. For example, FIG. 3 shows the exemplary schedule depicted in FIG. 2, but using CPM instead of GPM. Due to its early dates orientation, CPM treats floats as measuring only delay and CPM does not calculate available drift, if an activity is scheduled between early and late dates, or on its late dates. As a result, the schedule 300 in FIG. 3 defaults to drift of zero for all activities, and shows only float, which equals total float in CPM.

Contrasting FIGS. 2 and 3, the activity "Finish MEP" 220, as shown in the example in FIG. 2, has a total duration of 71 days 224, a float equal to 11 days 226, and a drift equal to 20 days 222. The planned start date of activity 220 is May 13 228, which is not its earliest start date, e.g. the activity 220 has 20 days of drift. In contrast, utilizing CPM as shown in the example in FIG. 3, the activity "Finish MEP" 320, has the same total duration of 71 days 324, but its float is equal to 31 days 326, and it has no drift 322. Because CPM is early date oriented, the activity 320 is represented as starting on April 23 328, its earliest start date. FIG. 4 shows a chart 400 contrasting GPM and CPM solutions relative to drifts and floats based on the schedules 200 and 300 shown in FIGS. 2 and 3, respectively. As shown in the chart 400, GPM calculates float 402 and drift 404, CPM calculates only float 406, not drift 408, and GPM's float 402 and drift 404 equals CPM total float 410.

When statusing the system 100, activities are on actual dates, which, except for critical activities, are not necessarily the earliest possible actual dates. The system 100 may automatically correct logic ties if actual dates for related activities are out-of-sequence, described below. A completed activity that could have floated to later actual dates without delaying the project has forensic float. A completed activity that could have drifted to earlier actual dates without forcing an earlier project start has forensic drift. Any completed activity with forensic drift plus forensic float equal to or less than zero with respect to the required completion date is on the as-built critical path.

Figure 5:
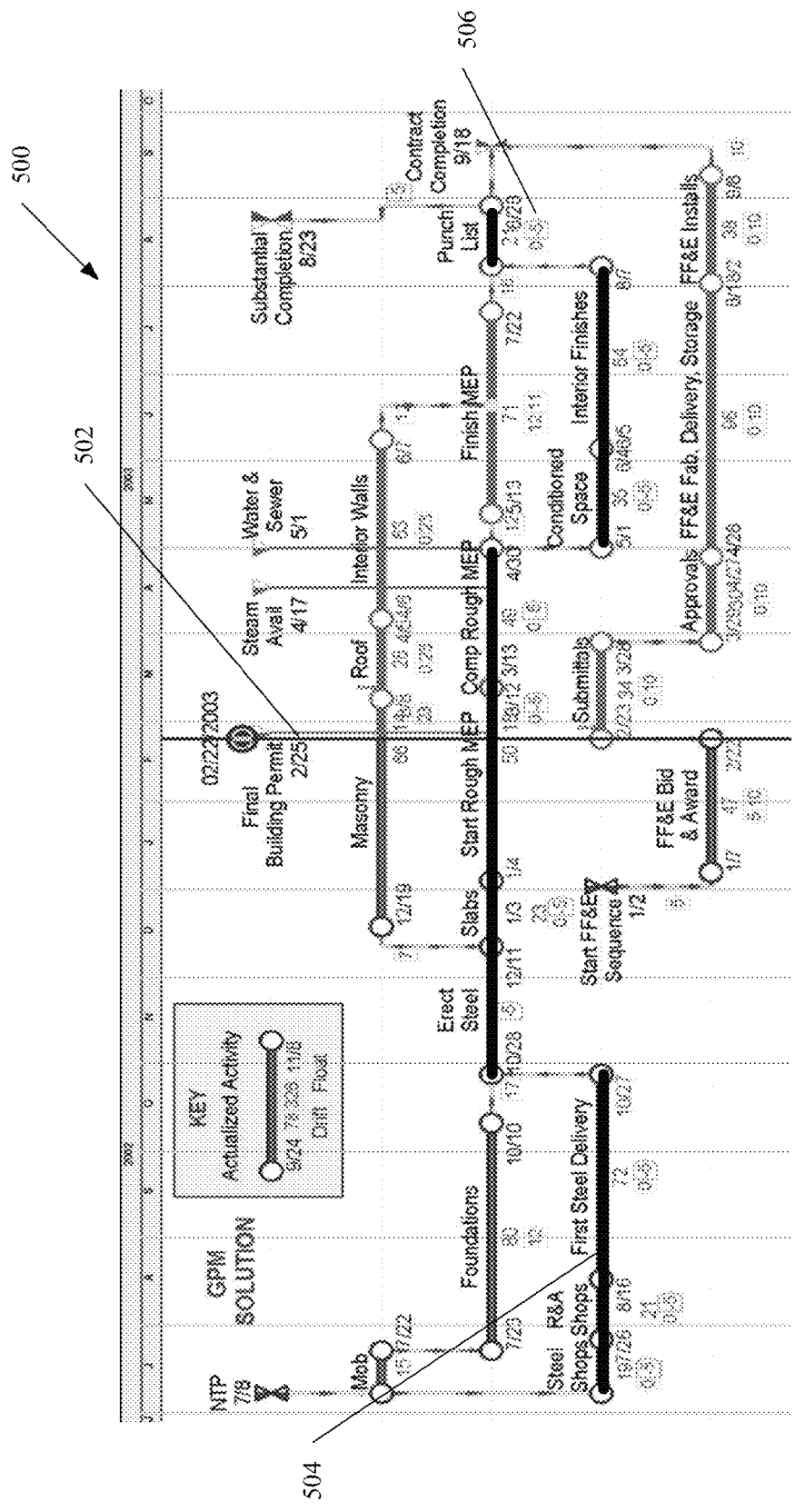
FIG. 5 is an exemplary project schedule.
Figure 6:
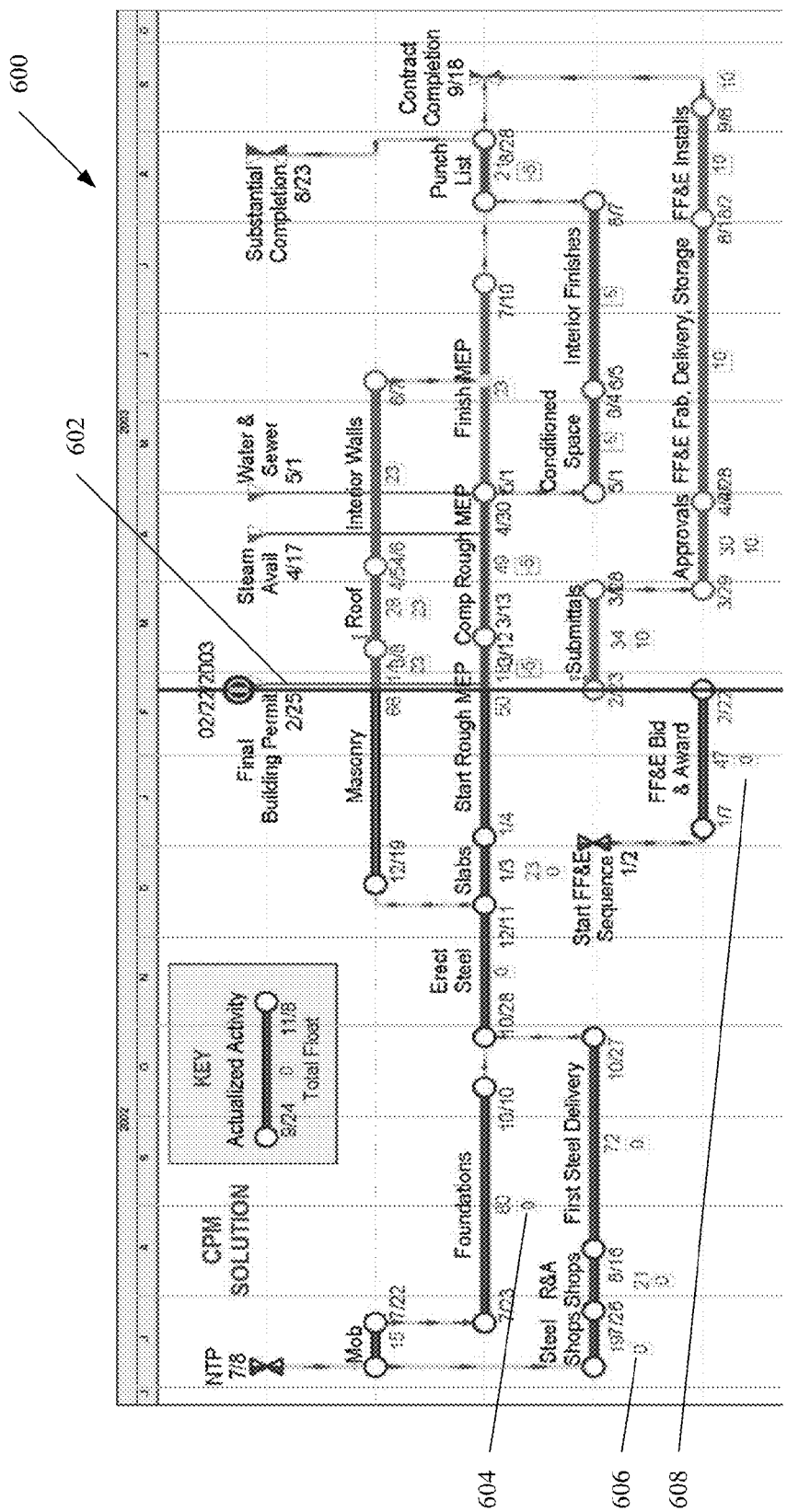
FIG. 6 is an exemplary project schedule.

FIG. 5 shows an exemplary GPM schedule 500 statused as of the data date 502 Feb. 22, 2003 and displaying forensic floats and drifts. As shown, the critical path 504 (and shown in bold) from the data date on forward is calculated by GPM as having total float minus five days, shown at 506. In addition, the floats and drifts are maintained by the system 100 to the left of the data date. In contrast, FIG. 6 shows the schedule 600 in FIG. 5, but utilizing CPM. As shown, the activities right of the data date 602 are on early dates, and activities left of the data date have zero total float, shown at, for example, 604, 606 and 608. CPM does not maintain float calculations to the left of the data date.

On either side of the data date line, the GPM algorithms calculate link gaps from the predecessor and successor relevant dates using essentially the same algorithms. From link gaps, floats, drifts and total floats are calculated, also using the same algorithms. With activities scheduled anywhere within total float range (focus on planned versus conventional CPM early dates), GPM provides five prospective floats. First, float measures days an activity may slip from and/or extend beyond planned dates without extending project completion or an interim completion date. As float results from planner-devised logic, it is neither scheduled float nor remaining float. Second, drift (preceding float) measures days an activity may gain from planned dates and/or extend to earlier dates without forcing an earlier project start or release date. Drift is not backward total float, as it is not necessarily measured from late dates. Third, for every activity, float plus drift equals conventional CPM total float. Fourth, buffer equals the minimum of all link gaps to the activity's successors. Fifth, drift-buffer equals the minimum of all link gaps from the activities predecessors.

In addition, forensic float, forensic drift and forensic total float counterparts (left of data date) are provided. Herein, forensic float, forensic drift and forensic total float may be referred to collectively as forensic attributes. As forensic float only measures what slippage might have been available after actual dates, forensic drift measures what schedule gain might have been available from actual dates is required for forensic total float to be correctly calculated.

Figure 7:
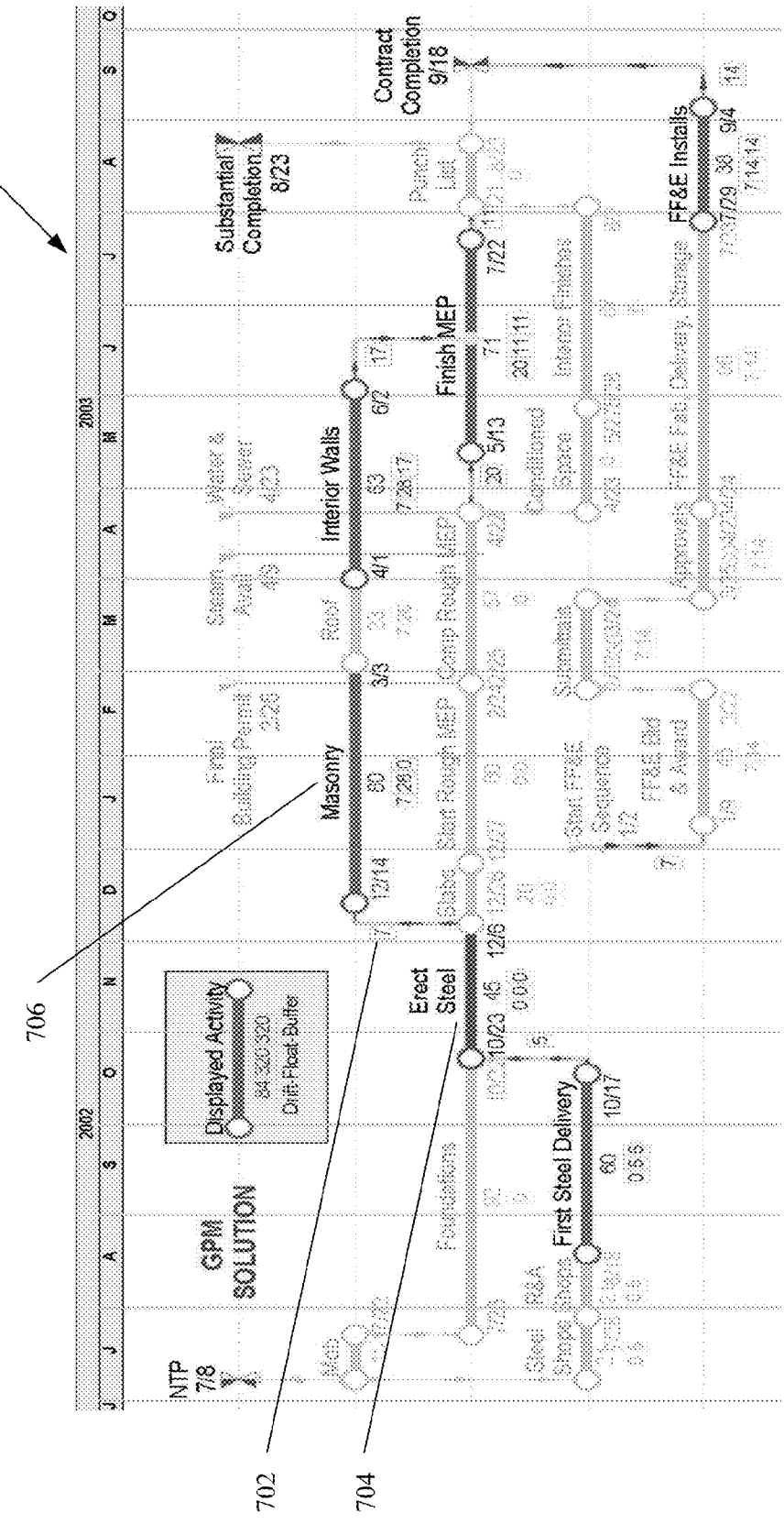
FIG. 7 is an exemplary project schedule.

Link gaps are key in GPM calculations as all floats and drifts originate at the gap level. Gap measures days the predecessor may slip and/or extend without delaying its successor. Drift-gap measures days the successor may gain and/or extend to earlier planned dates without forcing the predecessor back. Due to its time-scale orientation, LDM simplifies the understanding of how gaps and drift-gaps are calculated. For example, in the exemplary GPM schedule 700 shown in FIG. 7, which highlights drift, float and buffer for selected activities, the gap 702 between activities "Erect Steel" 704 and "Masonry" 706 is dimensioned by the link horizontal leg (7 days). If different calendars apply, the link gap is calculated using the predecessor's work week; conversely, the drift-gap is calculated using the successor's work week.

Once activities are statused in the system 100, i.e. actual dates are introduced, gaps right of the data date are calculated from planned dates, forensic gaps left of the data date are calculated from actual dates. Float calculations are nuanced vis-á-vis the data date. For remaining activities, calculation of floats, drifts and total floats is prospective and calculation relies on activity planned dates. For in-progress activities, total float calculations apply to remaining durations and are prospective. Actualized link offsets, also referred to as PDM lags, are left out of the calculations and forensic drifts are calculated from forensic gaps. For completed activities, calculation of forensic floats, forensic drifts and forensic total floats is retrospective and relay on forensic gaps.

Figure 8:
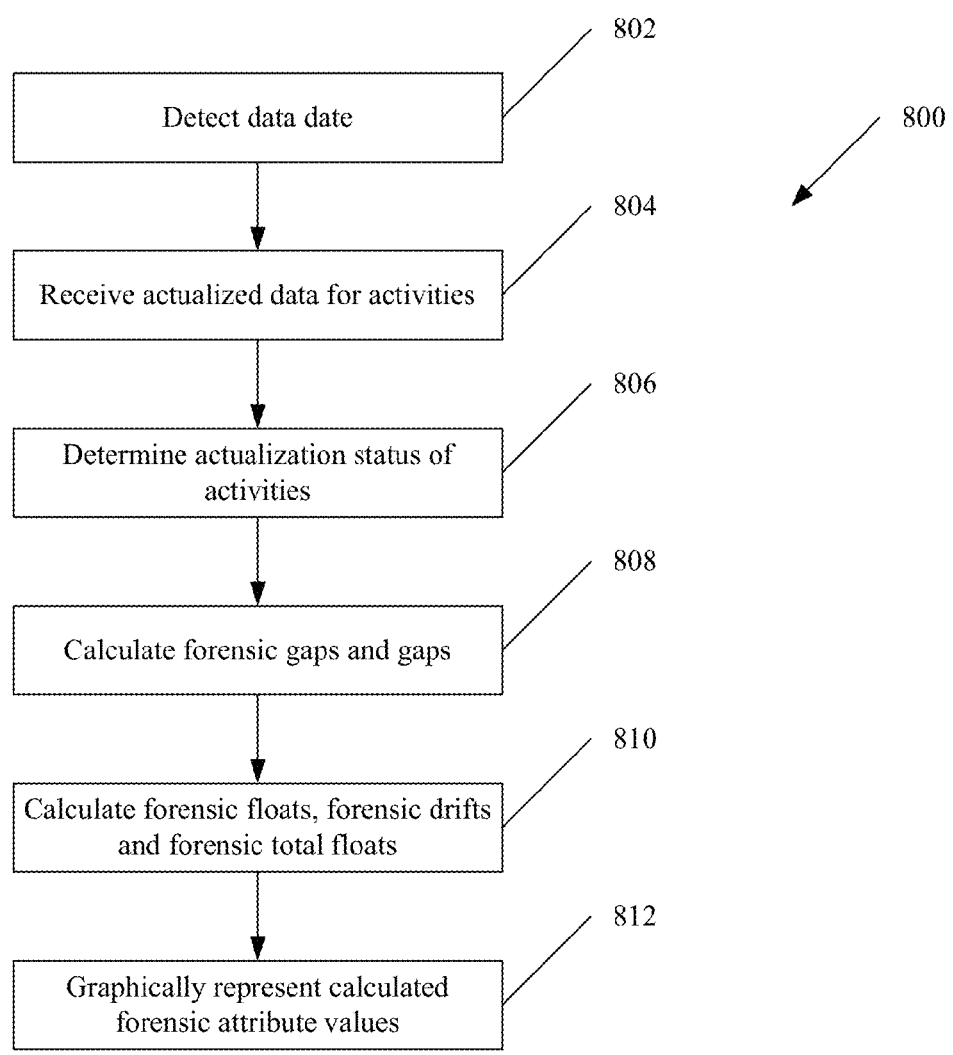
FIG. 8 is a flow chart of one example of performing forensic schedule analysis.

A flow diagram illustrating an exemplary process 800 for performing forensic schedule analysis is shown in FIG. 8. The process 800 may be implemented for use with the system 100 of FIG. 1, or a different system. The process 800 begins with the detection of the data date introduced to a schedule. The data date may be entered to the system 100 by a user through use of a computer mouse, keyboard through a dialog box, gestural and/or surface input. The data date may be stored in memory as a data structure with data representative of the data date. The data date may be graphically represented on the schedule. The data date may represent the end of a particular day to where the project has progressed.

The process 800 proceeds to block 804 where actualized data for activities is received. The actualized data may include actual start dates, actual complete dates and actual durations of activities or other objects. In one example, a user may select a completed activity or an in-progress activity and enter its actualized data. A user may also slide, shorten or lengthen a completed activity or an in-progress activity along the time-scaled display to correspond with the actual start and completion dates for completed activities, or start dates for in-progress activities. The actualized data may be stored with the data structures representative of the appropriate activities or objects.

The process 800 proceeds to block 806 where the actualization status of the activities is determined. The actualization status may be determined in relation to the data date. The actualization status of an activity may include a remaining activity, or an activity that has not started as of the data date, an in-progress activity, or an activity that has started prior to the data date, but has not been completed, and a completed activity, or an activity that has been fully completed as of the data date.

The process 800 proceeds to block 808 where the forensic gaps and gaps are calculated based on an algorithmic function of all link gaps on either side of the data date. The forensic gaps are calculated from actual dates prior to the data date. The forensic gap values may be stored with the data structures representative of the appropriate activities and/or logic relationships. The process 800 proceeds to block 810 where the forensic floats, forensic drifts and forensic total floats are calculated. The forensic floats, forensic drifts and forensic total floats are calculated as a function of the forensic gaps left of the data date and the gaps calculated right of the data date. The calculations for forensic floats, forensic drifts and forensic total floats are retrospective with respect to the data date. The forensic floats, forensic drifts and forensic total floats may be stored with the data structures representative of the appropriate activities and/or logic relationships.

The process 800 proceeds to block 812 where the calculated forensic attribute values are graphically represented. The forensic attribute value may be associated with the appropriate activity positioned on the time-scaled display. In one example, the forensic float and forensic drift are displayed underneath the appropriate activities positioned on the time scaled display. The forensic attribute values may continuously and automatically refresh in real-time any time a gap on either side of the data date takes on a revised value due to activities being repositioned on the timescale.

The process 800 may also calculate gaps from planned dates that occur subsequent the data date. Based on the calculated forensic gaps and gaps, the process 800 may calculate floats, drifts and total floats. The calculations of floats, drifts and total floats are prospective and rely on activity planned dates. The gaps, floats, drifts and total floats may be stored with the data structures representative of the appropriate objects. The calculated gaps, floats, drifts and/or total floats may also be graphically represented, and these values may be associated on the time-scaled display with the appropriate objects. In one example, a user may toggle between displaying forensic float and float.

Figure 9:
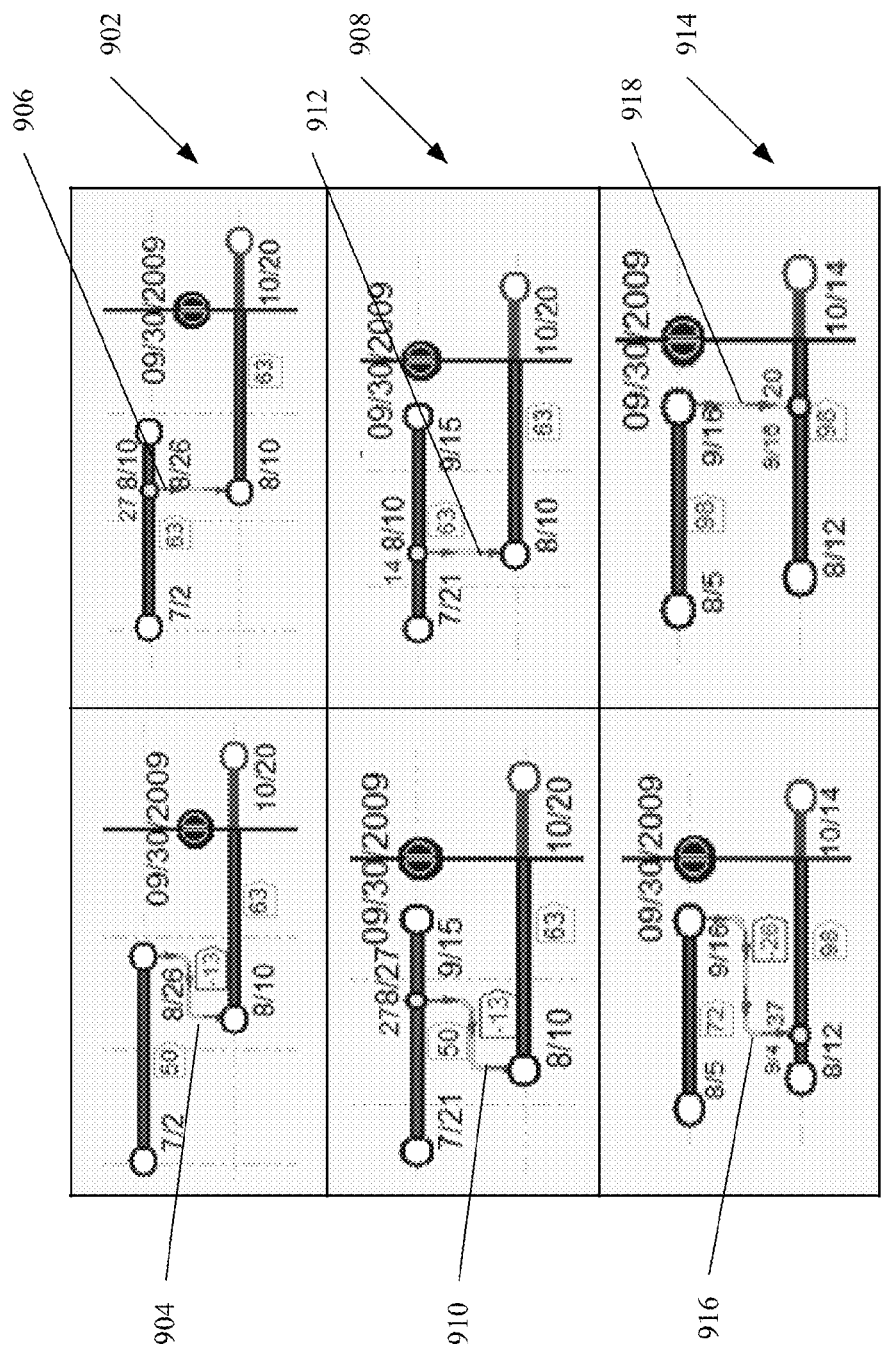
FIG. 9 is an exemplary project schedule.

Out-of-sequence progress causes negative forensic gaps, which reduces forensic drifts and floats. Corrected logic rules, including omitted logic options, which provide for equivalent zero-gap logic ties or equivalent finish-to-start ("FS") logic ties by subdividing the predecessor and/or successor solve the ambiguity. For example, FIG. 9 shows three examples of correct logic rule options, assuming a data date of Sep. 30, 2009. In the first example 902, the negative-gap finish-to-start ("FS") logic, represented in partial schedule 904, may be corrected by (1) a zero-gap start-to-start ("SS") link, as shown in corrected partial schedule 906, (2) a zero-gap finish-to-finish ("FF") link, or (3) by subdividing the predecessor. In the second example 908, the negative-gap SS logic, represented in partial schedule 910, may be corrected by (1) a zero-gap SS link, as shown in corrected partial schedule 912, (2) a zero-gap FF link, if successor's start is ahead of the predecessor's start and its finish is after the predecessor's finish, or (3) by subdividing the predecessor. In the third example 914, the negative-gap FF logic, represented in partial schedule 916, may be corrected by (1) a zero-gap FF link, as shown in corrected partial schedule 918, (2) a zero-gap SS link, if successor's actual finish is before the predecessor's, or (3) by subdividing the successor.

Figure 10:
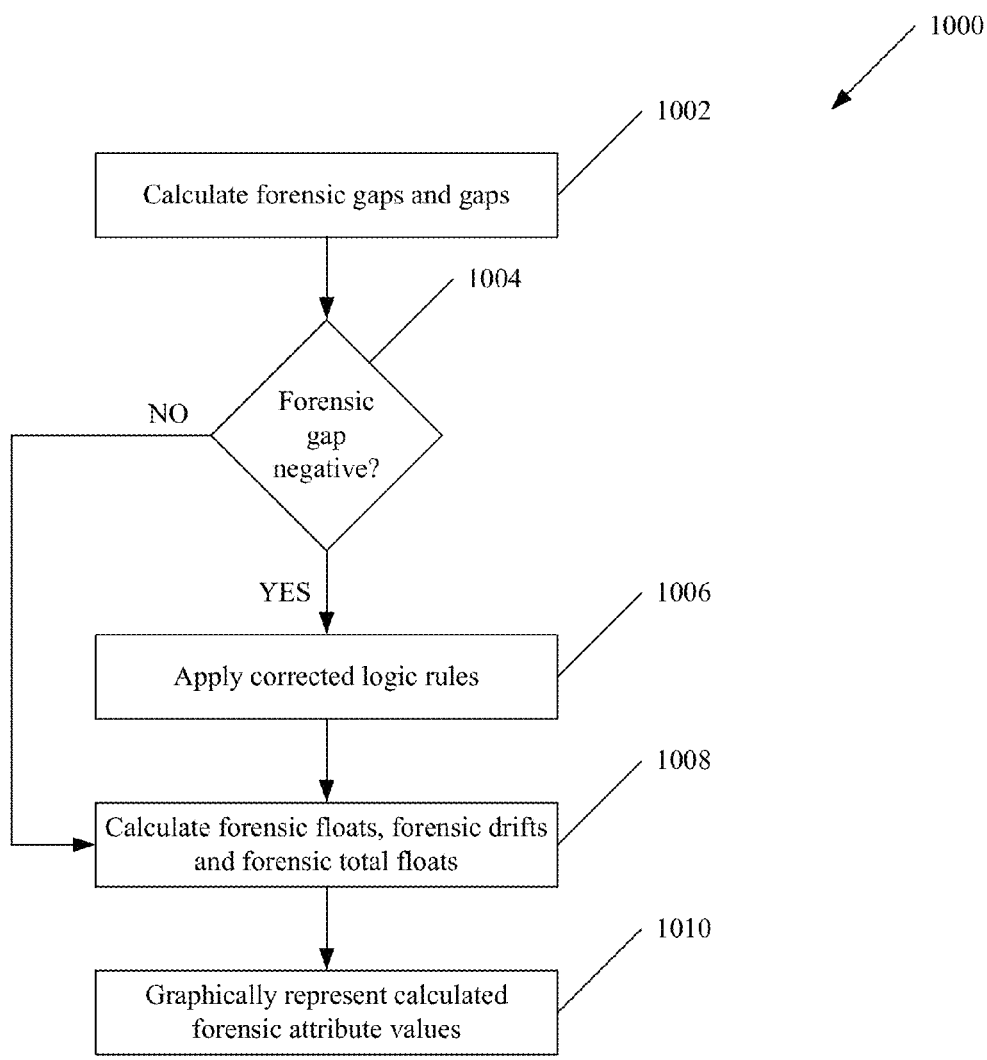
FIG. 10 is a flow chart of one example of applying corrected logic rules.

A flow diagram illustrating an exemplary process 1000 for applying corrected logic rules and calculating forensic float is shown in FIG. 10. The process 1000 may be implemented for use with the system 100 of FIG. 1, or a different system. The process 1000 begins with the calculation of forensic gaps and gaps. To the left of the data date, for each link, forensic gaps are calculated from the actual dates of the link predecessor and successor activities. To the right of the data date, for each link, gaps are calculated from planned dates of the link predecessor and successor activities.

The process 1000 proceeds to decision block 1004 where it is determined if any of the forensic gaps have a negative value, e.g. as the result of out-of-sequence progress of activities. If none of the calculated gaps are negative, the process 1000 proceeds to block 1008 where the forensic floats, forensic drifts and forensic total floats are calculated. If one or more negative forensic gaps are calculated, the process 1000 proceeds to block 1006 where one or more corrected logic rules are applied to correct the negative gaps. The corrected logic rules, as described herein, transform out-of-sequence progress (i.e. actualized logic ties with negative forensic gaps) into equivalent driving, zero-gap logic ties, or FS logic ties by subdividing the predecessor and/or successor activities.

After correcting the negative gaps, the process 1000 proceeds to block 1008 where the forensic floats, forensic drifts and forensic total floats are calculated. The forensic floats, forensic drifts and forensic total floats are calculated as a function of the forensic gaps and gaps. The forensic floats, forensic drifts and forensic total floats may be stored with the data structures representative of the appropriate activities and/or logic relationships. The gaps, floats, drifts and total floats are also calculated and may be stored with the data structures representative of the appropriate activities and/or logic relationships. The process 1000 proceeds to block 1010 where the calculated forensic attribute values are graphically represented. The forensic attributes may be associated with the appropriate activity positioned on the time-scaled display.

Forensic total floats are a function of forensic gaps (which are fixed unless the two actual dates are revised) and gaps right of the data date (which refresh to reflect current planned dates). From update to update (or window to window), as activity dates and logic ties are actualized left of the closing date, and revised right of the closing date, forensic floats and drifts, and thus forensic total floats, continuously refresh algorithmically, just as their counterparts to the right of the data date. The refreshing occurs in real-time, which allows users to instantaneously see the effects to the schedule statused to a data date. This transient property of forensic total float supports the view that any forensic schedule analysis relying on the as-built schedule as-is, without collapsing, is fundamentally flawed. Also, it introduces a heretofore undetected premise: retrospective TIA analysis must rely on windows of adequate duration to sufficiently consider the transient nature of forensic total float.

In GPM scheduling, actual dates, and thus forensic gaps, remain fixed left of the data date, but total float calculations remain active on both sides of the data date line. This means that, as a transient attribute, like the critical path itself, forensic total floats convert to as-built floats in the final update (data date equal to the project completion date).

Figure 11:
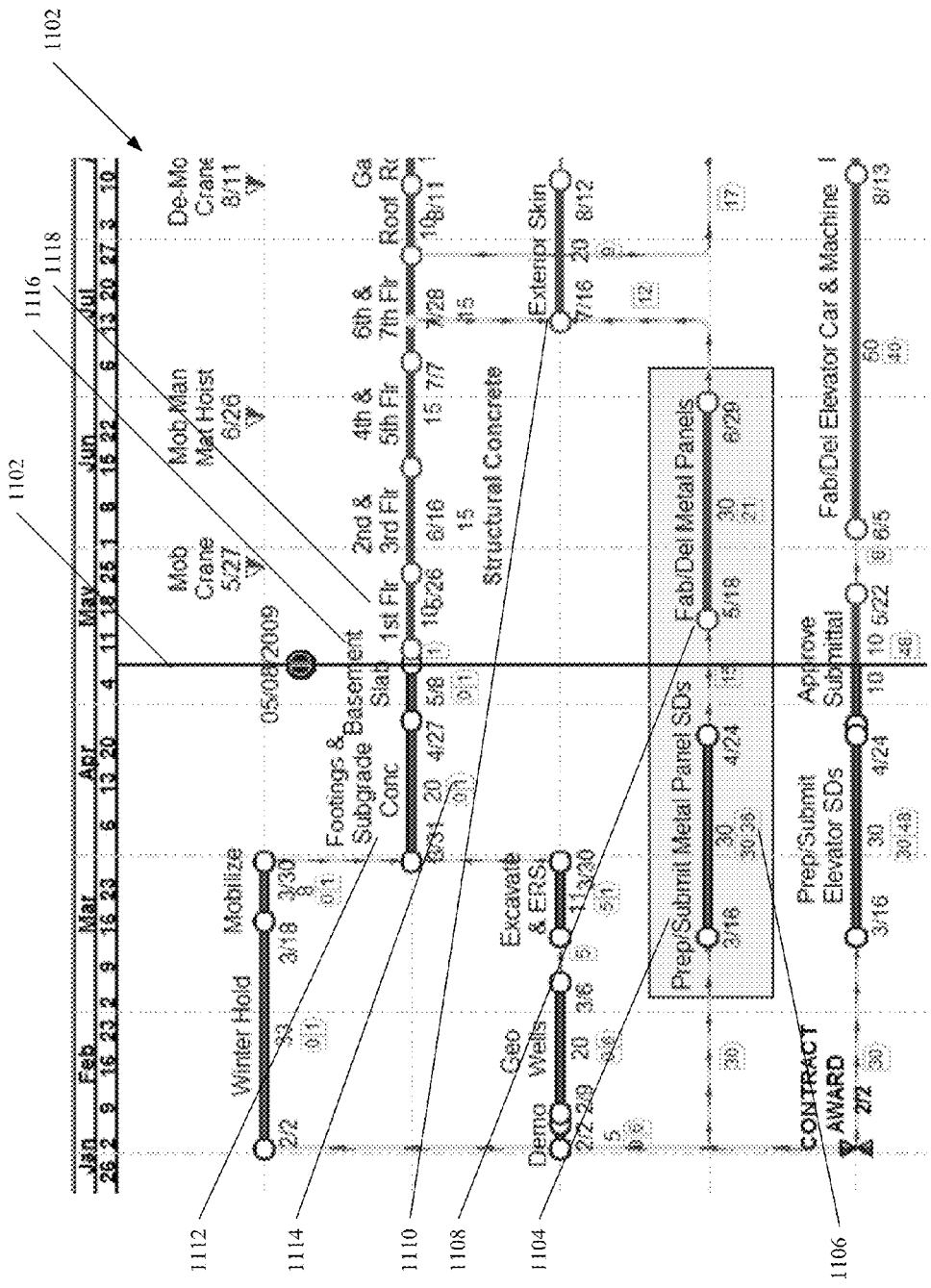
FIG. 11 is an exemplary project schedule.
Figure 12:
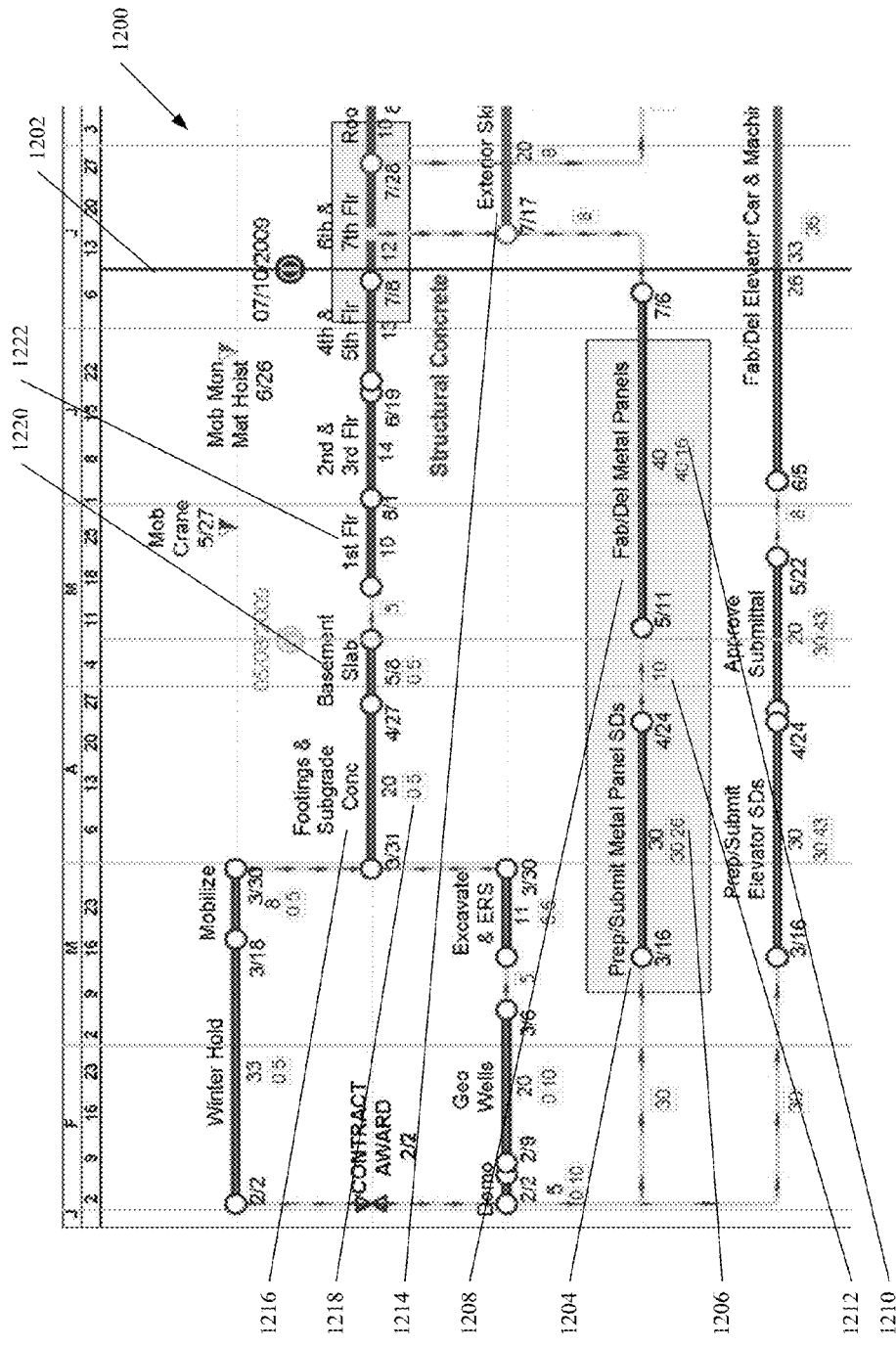
FIG. 12 is an exemplary project schedule.

FIGS. 11 and 12 show an exemplary GPM schedule 1100, 1200, with forensic gaps and floats left of data date May 8, 2009 1102 for FIG. 11 and data date Jul. 10, 2009 1202 for FIG. 12. As shown, the forensic float for activity "Prep/Submit Metal Panel SDs" 1104, 1204 refreshes from 36 days 1106 to 26 days 1206, as the data date is updated from its position in FIG. 11 to its position in FIG. 12. The refreshed forensic float is based on the forensic float status of activity "Fab/Del Metal Panels" 1108, 1208 which is 16 days 1210 as shown in FIG. 12, and the forensic gap 1212, which is 10 days as shown in FIG. 12. The forensic float of activity "Fab/Del Metal Panels" 1108, 1208 is controlled by the float of activity "Exterior Skin" 1110, 1214, a remaining activity right of data line 1202 shown in FIG. 12.

Similarly, the forensic float of for activity "Footings & Subgrade Conc." 1112, 1216, which is one day 1114 as shown in FIG. 12, increases to five days 1218 with the updated data date 1102, 1202. The increased forensic float is due to the forensic gap that developed between successor activity "Basement Slab" 1116, 1220, and activity "1st Flr" 1118, 1222. Forensic floats and forensic drifts (and therefore forensic total floats) of other completed activities similarly react to downstream gaps.

Figure 13:
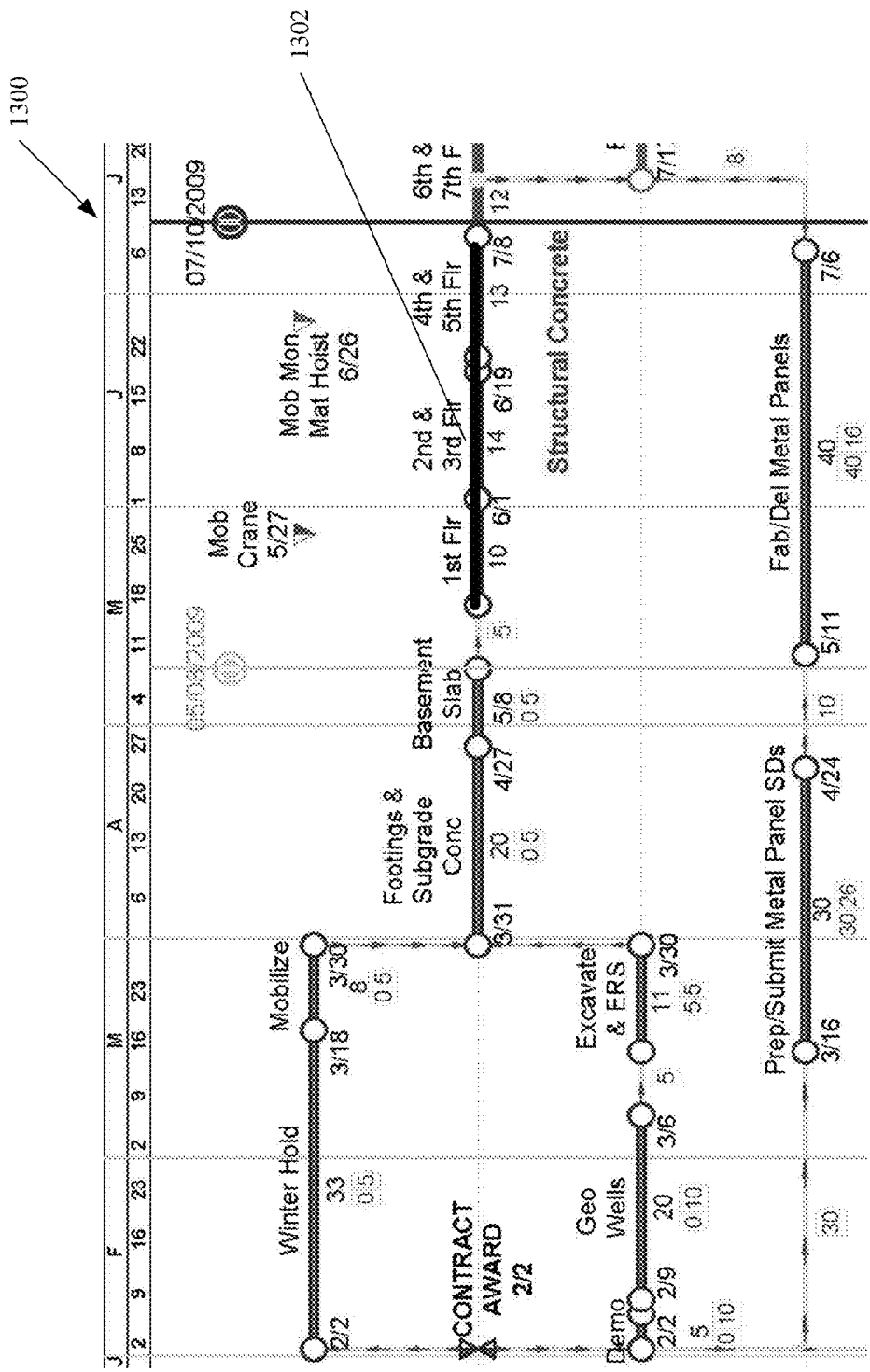
FIG. 13 is an exemplary project schedule.
Figure 14:
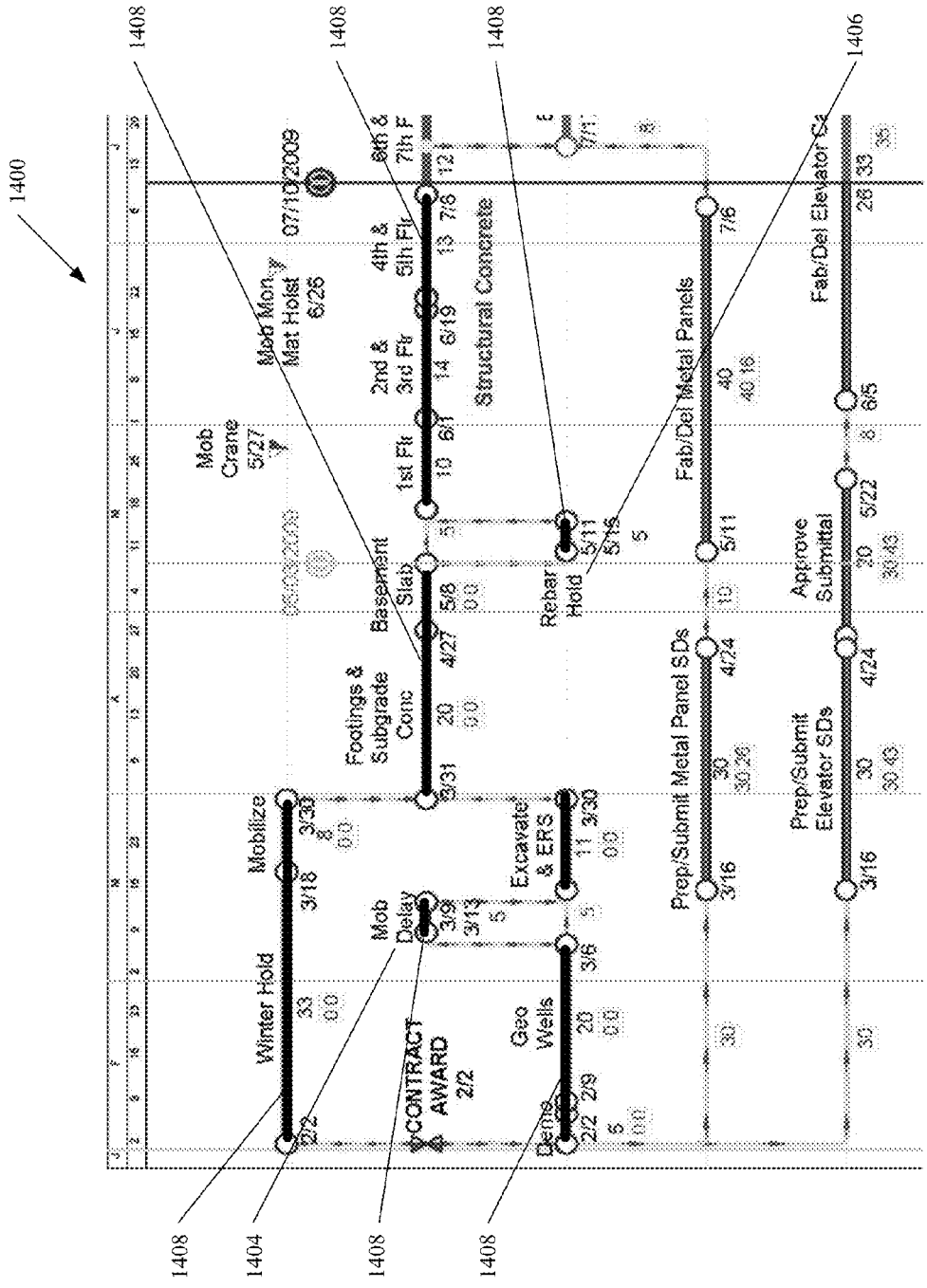
FIG. 14 is an exemplary project schedule.

The as-built critical path is discernible with forensic total floats. Conventionally speaking, a completed activity with forensic float and drift of zero has forensic total float of zero. Breaks in the as-built critical path stand out and are fixed by recognizing the concealed delay otherwise posing as a non-driving link (positive-forensic gap). For example, FIGS. 13 and 14 show two snapshots, 1300 and 1400, respectively, of the GPM schedule shown in FIG. 12. In FIG. 13, seemingly, there is no as-built path with activities having both zero forensic drift and forensic float. FIG. 14 reveals the as-built critical paths 1402 (shown in bold) with the addition of activities "Mod Delay" 1404 and "Rebar Hold" 1406. These activities 1404 and 1406 are concealed delays in the as-built condition that prevented earlier actual start dates for their respective successor critical activities. Compare the as-built critical paths 1302, 1408 shown in bold in FIGS. 13 and 14.

The significance of the retrospective computation power of the system 100 may be illustrated by a comparison of tables shown in FIG. 15, which summarize the primary methods of schedule analysis and the calculations available using GPM (table 1500a) and CPM (table 1500b). As expected, GPM has no impact on a fully-prospective method, such as the IAP method. With both soft and hard data dates on the project start event date, and neither actual dates nor actual durations allowed, the as-planned schedule does not rely on a data date, and is precisely the schedule model for which CPM was developed. On the other hand, network mathematics remaining active on either side of the data date has positive implications for a schedule model that uses the concept of a hard data date. Such models include any TIA baseline, schedule update (recreated or contemporaneous) and any as-built schedule.

System 100 allows analysts to introduce actual dates when statusing a TIA window. With the baseline fully statused through the data date immediately before the occurrence of the delay event being evaluated, actual dates and forensic total floats for delays left of the closing date are based on the dates and logical sequence in which they occurred. With the schedule fully-statused left of the data date including total floats, (and possibly negative total floats) concurrent and pacing delays can be mathematically discerned.

System 100 also allows practitioners to modify the periodic updating process into modeled updates that extract time impacts, calculate forensic total float and locate the critical path left of the data date. With GPM, methods relying on updates, which in the CPM world are de facto observational, can be approached as modeled methods. In light of the statusing predicament, documented in forensic scheduling literature, modeled updates, with a consistent set of rules, may support more accurate total floats and critical paths than current practice.

System 100 obviates the need for prospective simulations to perform but-for calculations on the as-built schedule. These simulations, which substitute earliest possible dates for actual dates, are not needed for two reasons. First, there is no need to set the data date back for GPM to calculate forensic total float. Second, GPM calculates available drift and float from actual dates, which eliminates the need to replace actual dates with simulated early dates.

With delays and gains extracted and total float calculations remaining active (which locate the as-built critical path), the as-built schedule under GPM rules can be de-impacted (versus collapsed) using schedule crashing and extension rules introduced in the early days of CPM. These methods crash/extend a schedule by crashing and extending critical activities, which is analogous to zeroing out delays and stretching gains when de-impacting the as-built to correlate critical path prolongation to specific delays.

System 100 unlocks the retrospective analytical power of networking methods. There are several benefits from network mathematics remaining active either side of the data date. System 100 may allow use of the as-built schedule as-is in but-for simulations. There is no need to reset the data date back in time or replace actual dates with simulated earliest possible dates. This removes a practical impediment to collapsed as-built schedule methods.

System 100 may allow analysts to introduce actual dates when statusing a TIA window. As any TIA model relying on the GPM algorithms is as-built (fully statused) left of the closing date, a GPM-enhanced TIA method, by itself, accounts for concurrent and pacing delays. With GPM, forensic schedule analysis methods relying on recreated updates, which in the CPM environment are de facto observational, can be approached as modeled methods, provided updates are recreated using as-built records.

The system 100, by supporting GPM rules, may automatically heal corrupted logic right of the data date and automatically and continuously refresh forensic float, forensic drift and forensic total float left of the data date, and float, drift and total float right of the data date. The system 100 may optimize the schedule by sliding and/or shortening or lengthening activities, and maintain forensic float, forensic drift and forensic total float current with respect to such optimization schemes taking place right of the data date.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A method of forensic schedule analysis comprising:
   detecting, by a processor, a data date positioned on a time-scaled display as a function of time;
   calculating at least one of a forensic float and a forensic drift for at least one completed activity as a function of at least one forensic gap related to a linked activity, the at least one completed activity having an actual date prior to the data date, wherein the forensic float is an attribute of the completed activity that defines a number of days that the completed activity could have floated beyond its actual date without delaying a project or an interim completion date, the forensic drift is an attribute of the completed activity that defines a number of days that the completed activity could have drifted to an earlier actual date without forcing an earlier project start or earlier interim release date, and the at least one forensic gap is an attribute that defines a number of days that the completed activity could have slipped or extended or started earlier without impacting the linked activity; and graphically representing on the time-scaled display the at least one of the forensic float and the forensic drift in association with the at least one completed activity.

2. The method of claim 1 wherein the at least one of a forensic float and a forensic drift continuously refreshes automatically as any one linked activity or the data date is re-positioned on the time-scaled display.

3. The method of claim 1 wherein the time-scaled display is a schedule including the at least one completed activity and other graphical objects representing at least one of an activity, milestone, benchmark and embedded node, prior to and subsequent to the data date, that are linked by at least one logic tie.

4. The method of claim 1 wherein the at least one gap measures overall time interval between connected dates of two linked activities.

5. The method of claim 1 wherein the at least one of a forensic float and a forensic drift of the at least one completed activity additionally includes calculating forensic total float as a sum of the forensic float and the forensic drift.

6. The method of claim 1 wherein the calculating further comprises calculating the at least one of a forensic float and a forensic drift as a function of at least one forensic gap associated with the linked activity, and the linked activity is completed prior to the data date.

7. The method of claim 1 further comprising identifying whether the at least one completed activity, at the time of the data date, falls on an as-built critical path.

8. A method of forensic schedule analysis comprising:
   detecting, by a processor, a data date positioned on a time-scaled display as a function of time;
   calculating at least one of a forensic float and a forensic drift for at least one completed activity, wherein the forensic float is an attribute of the at least one completed activity that defines a number of days that the completed activity could have floated beyond its actual date without delaying a project or an interim completion date, the forensic drift is an attribute of the at least one completed activity that defines a number of days that the completed activity could have drifted to an earlier actual date without forcing an earlier project start or earlier interim release date; the at least one completed activity comprising a first completed activity, the first completed activity being linked to a second completed activity, and the calculating further comprising calculating a forensic gap as a function of a link between the first completed activity and the second completed activity, wherein the forensic gap is an attribute that defines a number of days that the first completed activity could have slipped or extended or started earlier without impacting the second completed activity;
   graphically representing on the time-scaled display the at least one of the forensic float and the forensic drift in association with the at least one completed activity; and
   applying at least one corrected logic rule to at least one link between the first completed activity and the second completed activity where the calculated forensic gap comprises a negative value.

9. The method of claim 8 wherein the at least one corrected logic rule comprises replacing a negative-gap logic relationship with a zero-gap logic relationship.

10. A method of calculating at least one of a forensic float and a forensic drift, comprising:
    receiving, by a processor, a first completed activity and a second completed activity as a function of a detected data date;
    calculating, by a processor, at least one of a forensic float and a forensic drift of at least one completed activity as a function of forensic gaps related to linked activities completed prior to a data date and gaps related to linked uncompleted activities starting after the data date, the at least one completed activity having an actual date prior to the data date, wherein the forensic float is an attribute of the completed activity that defines a number of days that the completed activity could have floated beyond its actual date without delaying a project or an interim completion date, the forensic drift is an attribute of the completed activity that defines a number of days that the completed activity could have drifted to an earlier actual date without forcing an earlier project start or earlier interim release date, the forensic gaps are attributes that define numbers of days that the completed activity could have slipped or extended or started earlier without impacting, respectively, the linked activities, and the gaps are attributes that define the numbers of days that linked uncompleted activities could have slipped or extended or stated earlier without impacting, respectively, other linked uncompleted activities.

11. The method of claim 10 wherein the at least one of a forensic float and a forensic drift continuously refreshes automatically when either the first completed activity or the second completed activity or the data date is re-positioned.

12. The method of claim 10 wherein the at least one of a forensic float and a forensic drift continuously refreshes automatically when the at least one forensic gap located left of the data date changes value.

13. The method of claim 10 wherein the at least one of a forensic float and a forensic drift continuously refreshes automatically when the at least one gap located right of the data date changes value.

14. The method of claim 10 wherein the at least one of a forensic float and a forensic drift continuously refreshes automatically until the data date equals an actual project completion date.

15. The method of claim 10 wherein the at least one of a forensic float and a forensic drift continuously refreshes automatically as corrupted logic relationships to the right of the data date are healed automatically as one or more activities are re-positioned to optimize a project schedule.

16. The method of claim 10 further comprising applying at least one corrected logic rule to at least one of the first completed activity and the second completed activity where the calculated forensic gap comprises a negative value.

17. A method of calculating at least one of a forensic float and a forensic drift, comprising:
    receiving, by a processor, a first completed activity and a second completed activity as a function of a detected data date;
    calculating at least one of a forensic float and a forensic drift as a function of at least one forensic gap calculated prior to the detected data date and, for the forensic float, at least one gap calculated subsequent to the detected data date; and
    applying at least one corrected logic rule to at least one link between the first completed activity and the second completed activity where the calculated forensic gap comprises a negative value, wherein the forensic float is an attribute of, respectively, the first completed activity or the second completed activity that defines a number of days that, respectively, the first completed activity or the second completed activity could have floated beyond its actual date without delaying a project or an interim completion date, the forensic drift is an attribute of the first completed activity or the second completed activity that defines a number of days that, respectively, the first completed activity or the second completed activity could have drifted to an earlier actual date without forcing an earlier project start or earlier interim release date, the at least one forensic gap is an attribute that defines a number of days that, respectively, the first completed activity or the second completed activity could have slipped or extended or started earlier without impacting a linked activity, and the at least one gap is an attribute that defines a number of days that any activity subsequent to the detected data date can slip or extend or start earlier without impacting the linked activity.

18. A system for performing forensic schedule analysis comprising:
   an event processor operable to detect a data date and receive actualized data for a successor activity and a predecessor activity having actual dates prior to the data date, wherein the successor activity and predecessor activity are linked by a logic tie with a forensic gap;
   an object processor coupled with the event processor and operable to represent the actualized data as one or more data structures and store the data structures in memory;
   a logic processor coupled with the object processor and operable to calculate at least one of a forensic float and a forensic drift of the predecessor activity and the successor activity as a function of the actualized data, the forensic gap related to the successor activity and predecessor activity and other forensic gaps and gaps related to other predecessor activities and successor activities; and
      a graphics processor coupled with the object processor and operable to display the at least one of the forensic float and the forensic drift on a time-scaled display in association with the successor activity and the predecessor activity, wherein the forensic float is an attribute of, respectively, the predecessor activity or the successor activity that defines a number of days that the predecessor activity or the successor activity could have floated beyond its actual date without delaying a project or an interim completion date, the forensic drift is an attribute of, respectively, the predecessor activity or the successor activity that defines a number of days that, respectively, the predecessor activity or the successor activity could have drifted to an earlier actual date without forcing an earlier project start or earlier interim release date, the forensic gap is an attribute that defines a number of days that, respectively, an activity could have slipped or extended or started earlier without impacting a linked activity, and the gap is an attribute that defines a number of days that, respectively, the predecessor activity or the successor activity could have slipped or extended or started earlier without impacting the other predecessor activities and successor activities.

19. The system of claim 18 wherein the logic processor is operable to calculate the forensic float of the predecessor activity as a function of the forensic gap related to, and forensic float of, the successor activity.

20. The system of claim 18 wherein the logic processor is operable to calculate the forensic drift of the successor activity as a function of the forensic gap related to, and a forensic drift of, the predecessor activity.

21. The system of claim 18 wherein the logic processor is operable to calculate a forensic float as a minimum of a sum of the forensic gap and a forensic float with all linked successor activities, and a forensic drift as a minimum of a sum of the forensic gap and forensic drift with all linked predecessor activities.

22. The system of claim 18 wherein the logic processor is operable to establish that the predecessor activity and successor activity fall on an as-built critical path as of the data date in response to forensic total float being equal to the total float of the as-built critical path after the data date.

23. The system of claim 22 wherein the logic processor is operable to refresh the forensic attribute and the as-built critical path in real-time until the data date equals an actual project completion date.

* * * * *